(12) United States Patent
Eriksen et al.

(10) Patent No.: US 11,897,444 B2
(45) Date of Patent: Feb. 13, 2024

(54) BRAKE CYLINDER COMPRISING A MECHANICAL STOP

(71) Applicant: Asetek Danmark A/S, Aalborg East (DK)

(72) Inventors: André Sloth Eriksen, Nibe (DK); Kim Henriksen, Lundeborgvej (DK)

(73) Assignee: Asetek Danmark A/S, Aalborg East (DK)

( * ) Notice: Subject to any disclaimer, the term of this patent is extended or adjusted under 35 U.S.C. 154(b) by 0 days.

(21) Appl. No.: 17/711,682

(22) Filed: Apr. 1, 2022

(65) Prior Publication Data

US 2022/0332296 A1 Oct. 20, 2022

Related U.S. Application Data

(63) Continuation-in-part of application No. 17/445,638, filed on Aug. 23, 2021, now Pat. No. 11,680,587.

(30) Foreign Application Priority Data

Apr. 16, 2021 (EP) ..................................... 21168955

(51) Int. Cl.
*B60T 8/40* (2006.01)
*B60T 7/04* (2006.01)

(52) U.S. Cl.
CPC ................ *B60T 8/409* (2013.01); *B60T 7/04* (2013.01)

(58) Field of Classification Search
CPC ........ F15B 7/08; F15B 19/007; A63F 13/245; A63F 30/06; A63F 13/803; A63F 13/90; B60T 8/4086

See application file for complete search history.

(56) References Cited

U.S. PATENT DOCUMENTS 4,802,712 A * 2/1989 Resch ................... B60T 8/4004
303/114.1
4,949,590 A * 8/1990 Barker .................... B60T 11/22
74/513

(Continued)

FOREIGN PATENT DOCUMENTS

CN 112849108 A * 5/2021 ............ B60T 8/4086

*Primary Examiner* — Thomas E Lazo
(74) *Attorney, Agent, or Firm* — Finnegan, Henderson, Farabow, Garrett & Dunner LLP

(57) ABSTRACT

A brake cylinder configured to provide braking signaling to an automotive simulator, the brake cylinder includes a damper housing, a resilient damper arranged within the damper housing and a piston configured to move a block in the axial direction at least partially into the damper housing towards said resilient damper. The block comprises a mechanical stop configured to limit the axial movement of the piston in the axial direction. The brake cylinder further has a sensor configured to measure a response to movement of said piston and send a signal to a processor indicative of that movement. The brake cylinder is configured to be connected to a brake pedal. The mechanical stop divides the braking process into two phases a first phase where the pedal can be depressed and a second phase where the pedal cannot be pressed further due to the mechanical stop. In one variant the brake cylinder is a purely mechanical system with only the damper housing or in combination with a single cylinder chamber. Alternatively, the described cylinder chamber is a slave chamber for use in a hydraulic brake cylinder also including a master chamber in fluid connection with the slave chamber via a channel.

18 Claims, 11 Drawing Sheets

(56) References Cited

U.S. PATENT DOCUMENTS

| | | | |
|---|---|---|---|
| 6,267,456 B1* | 7/2001 | Crombez | B60T 13/686 60/591 |
| 8,561,401 B2* | 10/2013 | Klimes | B60T 7/042 60/555 |
| 8,707,820 B2* | 4/2014 | Fujiwara | G01L 5/225 74/512 |
| 8,893,579 B2* | 11/2014 | Fujiwara | B60T 7/042 74/512 |
| 9,442,030 B2* | 9/2016 | Fujiwara | B60T 7/042 |
| 9,545,904 B2* | 1/2017 | Masuda | B60T 11/20 |
| 2006/0064977 A1* | 3/2006 | Ohlig | B60T 7/042 60/534 |
| 2007/0018498 A1* | 1/2007 | Nakazawa | B60T 8/4081 303/119.3 |
| 2011/0296945 A1* | 12/2011 | Jaouen | G05G 1/60 74/512 |
| 2013/0167526 A1* | 7/2013 | Yoshizawa | G05G 5/05 60/533 |
| 2017/0190328 A1* | 7/2017 | Nakazawa | B60T 7/042 |
| 2019/0039590 A1* | 2/2019 | Maruo | B60T 8/4081 |
| 2021/0197083 A1* | 7/2021 | Baumgartner | G01L 5/225 |

* cited by examiner

BRAKE CYLINDER COMPRISING A MECHANICAL STOP

CROSS-REFERENCE TO RELATED APPLICATIONS

This application claims priority to European Patent Application No. 21168955.9 filed on Apr. 16, 2021. The application claims priority from U.S. application Ser. No. 17/445,638 filed on Aug. 23, 2021. The disclosures of the above-referenced applications are expressly incorporated herein by reference in their entirety.

BACKGROUND

Field of the Invention

Systems and devices consistent with the present disclosure generally relate to a brake cylinder comprising a mechanical stop. More particularly, systems and devices consistent with the disclosure relate to a brake cylinder comprising a mechanical stop for use in automotive simulators that is both cost effective to produce and provides authentic feedback when in use.

Discussion of the Related Art

Automotive simulation systems that simulate the experience of driving a car are used for both video gaming purposes as well as for training purposes for persons involved in driving, such as racing car drivers. To effectively achieve these video gaming and training purposes, the simulation provided by these automotive simulation systems must be able to replicate the experience of a real car with a high degree of accuracy and authenticity. However, designing an automotive simulation system that achieves a high degree of accuracy and authenticity is difficult and expensive to produce.

In order to make the simulation as close to reality as possible (i.e., with a high degree of accuracy and authenticity), it is important that in addition to the visual experience, user interface equipment such as steering wheels and brake systems have to be equal, or as close as possible, to that which is experienced in a real car. This allows for maximum learning potential in automotive simulation systems used for training and maximum entertainment emersion potential in automotive simulation systems used for video gaming purposes. Regarding brake systems in automotive simulation systems, it is not just important that the mechanical elements, such as the brake pedals, look like those and feel like those of a real car, it is also important to have the tactile response (e.g., the feedback and feel of pressing the brake pedal) in an automotive simulation system be the same as or similar to that which is experienced in a real car.

In conventional brake systems that are used in automotive simulation systems, depressing a brake pedal compresses a liquid (such as oil) in a chamber of a main brake cylinder. The elevated pressure in this chamber is then transferred to a slave cylinder where the pressure is measured. By converting the measured pressure in this slave cylinder, an electrical signal is generated which can be used as input to a simulation program of the automotive simulation system. These components of conventional brake systems take up a lot of space within the brake systems, and the incorporation of multiple interconnected chambers connected via tubes makes manufacturing/mass production of such conventional brake systems expensive.

Conventional brake systems that are used in automotive simulation systems and which are based on hydraulics are also prone to leak due to many fittings and connections that are each regions where fluid may leak out of the system. Fluid leakage causes the performance of the braking system to deteriorate over time and is a hazardous risk near electronics that may short-circuit due to leaking fluids.

One solution to this issue known in the art is to make braking system which are purely mechanical having no hydraulics and thus no fluid which can leak from the system. Such system relies on resistance solely from the compression and elastic deformation of a resilient piece of material. While such a solution solves the risk of leakage and is cheaper and simpler to produce, the tactile and physical feedback is significantly different from that of a real car.

In view of the foregoing, it is desirable to create a brake system that is simple and inexpensive to produce while maintaining the look and feel of a brake system in a real car. The brake cylinder comprising a mechanical stop for an automotive simulation system is directed to overcoming one or more of the problems set forth above and/or other problems of the prior art.

SUMMARY OF THE INVENTION

There is described a brake cylinder configured to provide brake signaling to an automotive simulator, the brake cylinder comprising: a piston configured to move in an axial direction; a dampening device configured to provide resistance to the piston when the piston moves in an axial direction toward the dampening device; at least one sensor configured to measure a response to movement of said piston and send a signal to a processor of the automotive simulator indicating of that movement, wherein said piston comprises a mechanical stop configured to limit said axial movement of the piston in the axial direction.

By axial movement of the piston is understood that it can move back and forth along its longitudinal axis, without movement in a transverse direction with respect to the longitudinal axis of the piston. Thus, if the piston is moving within a chamber or a hollow, e.g. inside the damper housing, in a variant the chamber and the piston are arranged coaxially such that the piston may translate back and forth within that chamber without the piston colliding with the wall of the chamber due to transverse or angled movement.

By a resilient damper is understood a damper which may be compressed under the force of the block and which will spring back into shape once the pressure is decreased and/or removed. Such a resilient damper may for example be a rubber structure or a type of spring.

In some variants the mechanical stop is made of a rigid material. In another variant the block and the mechanical stop are made of the same material, such as a rigid material.

The brake cylinder is adapted for use in a braking system including a brake pedal. The brake cylinder according to the disclosure may be of various types. It may be a mechanical brake cylinder including only a damper housing or a damper housing in combination with a cylinder chamber. Different types of sensors may be used for determining the amount of force applied to the brake pedal and in turn the amount of movement of the piston. Such sensors for the mechanical brake cylinder may for example be a load cell using a strain gauge, a rotary potentiometer or a Hall effect sensor in combination with a magnet. In other variants the brake cylinder may be part of a hydraulic system comprising multiple chambers, such as both a slave cylinder chamber configured and a master cylinder chamber, in addition to a damper housing. In the hydraulic variant, the two chambers are in fluid communication via at least one channel. In such a configuration the sensor may be a pressure sensor in fluid communication with the chambers of the brake cylinder. Any known type of sensor which is suitable for delivering a signal correlated to the pressure applied to the pedal may be used. In the automotive simulation the braking effect achieved for a given detection of the sensor may be adjusted based on user preference and/or other factors of the simulation such as grip on a simulated surface and/or the type of vehicle simulated. In all discussed embodiments of the invention, it is possible to use one or more sensors, hence it is possible to have multiple sensors either of the same type or of various known types used within a single brake cylinder regardless of whether there is a hydraulic or a mechanical brake cylinder.

In one embodiment the mechanical stop is configured to limit the axial movement of the block in the direction towards the resilient damper.

In another embodiment the mechanical stop is configured to limit the axial movement of the block by contact between the mechanical stop and the damper housing.

The mechanical stop of the block enables the braking process to be divided into two phases. During the first phase of the braking process, i.e. before the mechanical stop is engaged to limit the axial movement of the piston, the pedal can be moved, i.e. the pedal can be depressed. During the second phase of the braking process, i.e. once the stop is contacted, the mechanical stop limits the further movement of the pedal. By the mechanical stop limiting the further movement of the piston is understood an abrupt increase in the force required to move the pedal a predetermined distance compared to force required to move the pedal the same predetermined distance before the engagement of the mechanical stop. In some embodiments the mechanical stop will completely prevent the further movement of the pedal, i.e. movement of the pedal would require permanent deformation of the mechanical stop. In other embodiments it will be possible to move the pedal in the second phase as well although engagement the mechanical stop will cause the abrupt transition to an increased resistance felt by the user as force is applied to the pedal, thereby requiring an increased force to depress the pedal further. In embodiments the brake cylinder is configured such that the length of the first phase can be adjusted, by adjusting the distance the pedal has to travel before the mechanical stop is engaged for example by adjusting the space in the damper housing for the damper and exchanging the damper with one of different dimension. The two-phase braking process is equivalent to the feeling of a real pedal in a car where the resistance will change during the braking process.

The benefits of two-phase braking are achieved by the presence of a mechanical stop regardless of whether the brake cylinder is a lone mechanical cylinder or a slave cylinder in combination with a master cylinder in a hydraulic system. In hydraulic systems having two chambers the two-phase operation enabled by the mechanical stop is achieved independently of the arrangement of the master chamber and the slave chamber relative to each other, e.g. if they are integrated int eh same cylinder housing or if they are two separate chamber, or if they are parallel or located at an angle relative to each other.

The mechanical stop and the two-phase braking process is also beneficial in a mechanical system with a single cell, as the response the user gets from the pedal when using a brake cylinder with a mechanical stop is vastly improved in that it is more akin to that from a real car, while the bake cylinder for the simulation system remains cheap and simple to manufacture.

The mechanical stop and the two-phase braking process is beneficial in a hydraulic brake cylinder as it provides the user with feedback akin to that in a real car using a hydraulic brake system and having a two-phase braking process. In addition to the realistic tactile feedback the system has high precision as the increase in pressure within the brake cylinder chambers in the second phase of the braking process can be measured and provide the simulation system with feedback on the braking force throughout the braking process.

Hence, it is to be understood that when the brake cylinder is described the damper housing may stand alone or be connected to the end of a brake cylinder chamber. When connected to a brake cylinder chamber it may be a mechanical cylinder chamber which or a slave cylinder of the hydraulic system. This includes that the brake cylinder chamber may be the slave cylinder chamber, the piston may be the slave piston features such as a slave cylinder rod and a slave cylinder piston element. Alternatively, the brake cylinder may be mechanical brake cylinder with a mechanical cylinder chamber and a mechanical cylinder rod and a mechanical piston element.

It is to be understood that by the damper housing being coaxially adjacent the cylinder chamber is understood that the cylinder chamber and the inner volume of the damper housing where the damper is arranged are coaxial such that the piston may continue its translation from the cylinder chamber into the inner volume of the damper housing. The outer shape of the damper housing may vary between embodiments and may for example be asymmetric in a way where the entirety of the damper housing is not coaxial with the cylinder chamber, as long as the inner volume of the damper housing is.

In one embodiment there is described a brake cylinder configured to provide braking signaling to an automotive simulator, the brake cylinder including a brake cylinder chamber, a damper housing arranged coaxially adjacent to the brake cylinder chamber, a resilient damper arranged within the damper housing; a piston at least partially disposed within the cylinder chamber, the piston being configured to translate in the axial direction within the cylinder chamber and at least partially into the damper housing; translation away from the damper housing is translation in a first direction and translation towards the damper housing is translation in a second direction; a sensor configured to measure a response to movement of the piston affected by a brake pedal and send a signal to a processor indicating of that movement; wherein, the piston includes a block, the block comprising a mechanical stop configured to limit axial movement of the piston in the second direction via contact with the damper housing.

In one embodiment there is described a brake cylinder including a brake cylinder housing including (i) a master cylinder chamber, (ii) a slave cylinder chamber, and (iii) a wall disposed between the master cylinder chamber and the slave cylinder chamber, the wall defining at least one opening configured to provide fluid communication between the master cylinder chamber and the slave cylinder chamber; a master piston at least partially disposed within the master cylinder chamber, the master piston configured to pressurize fluid in the master cylinder chamber when a brake pedal is pressed; a slave piston at least partially disposed within the slave cylinder chamber; and a pressure sensor disposed in fluid communication with the slave cylinder chamber, the pressure sensor configured to measure pressure in the slave cylinder chamber and send a signal to a processor indicating of movement of the brake pedal; wherein, when pressurizing fluid in the master cylinder, the master piston is configured to drive fluid from the master cylinder chamber to the slave cylinder chamber via the at least one opening to increase pressure in the slave cylinder chamber.

It is to be understood that in variants with two-cylinder chambers, i.e. a master cylinder chamber and a slave cylinder chamber, the brake cylinder is a hydraulic closed system the pressure is the same inside the enclosure. Thus, the pressure sensor may be located anywhere in connection with the hydraulic system. For example the pressure is the same within the slave cylinder chamber and the master cylinder chamber the pressure sensor physically arranged to be in communication with either of the chambers as it will be in pressure communication with both chambers, and the rest of the brake cylinder, regardless.

In one embodiment, there is described a brake system including a base; a brake pedal pivotably connected to the base; and a brake cylinder pivotably connected to the brake pedal, the brake cylinder including: a brake cylinder housing including (i) a master cylinder chamber, (ii) a slave cylinder chamber, and (iii) a wall disposed between the master cylinder chamber and the slave cylinder chamber, the wall defining at least one opening configured to provide fluid communication between the master cylinder chamber and the slave cylinder chamber; a master piston at least partially disposed within the master cylinder chamber, the master piston configured to pressurize fluid in the master cylinder chamber when the brake pedal is depressed; a slave piston at least partially disposed within the slave cylinder chamber; and a pressure sensor disposed in fluid communication with the slave cylinder chamber, the pressure sensor configured to measure pressure in the slave cylinder chamber and send a signal to a processor indicating of movement of the brake pedal; wherein, when pressurizing fluid in the master cylinder chamber, the master piston is configured to drive fluid from the master cylinder chamber to the slave cylinder chamber via the at least one opening to increase pressure in the slave cylinder chamber.

As described above, the brake cylinder includes a brake cylinder housing with a master cylinder chamber and a slave cylinder chamber. The cylinder chambers are separated by the wall defining openings allowing liquid to pass from the master cylinder chamber to the slave cylinder chamber. The master cylinder chamber includes the master piston for connecting to a brake pedal (or similar interface), and the master piston when pushed is adapted to force liquid from the master cylinder chamber to the slave cylinder chamber via the openings. The slave cylinder chamber comprises a slave piston which is adapted to be pushed when liquid enters from the master cylinder chamber into the slave cylinder chamber.

In some variants the fluid communication between the master cylinder chamber and the slave cylinder chamber may be provided by another channel than the one or more openings in the wall between the chambers. For example, a channel may be provided in some other part of the brake cylinder, such as the outer wall, rather than the separating wall. Another example is by the presence of a tube extending externally from the brake cylinder, for example running along the outer surface of the brake system or connecting the master cylinder chamber and the slave cylinder chamber via another piece of equipment arranged in the fluid path of the channel.

The master cylinder chamber and the slave cylinder chamber are housed in a common brake cylinder housing. The master cylinder chamber includes the master piston which can affect a fluid which again can affect the slave piston in the slave cylinder chamber. The fluid may be an oil or another low-compressible liquid used in braking systems. The master cylinder chamber and the slave cylinder chamber are mutual connected via at least one opening. In a variant the master cylinder chamber and the slave cylinder chamber are substantially parallel. The two chambers are only separated by a wall constituting a part of the cylinder chamber wall in both cylinder chambers. The master piston is connected to the brake pedal via a master cylinder rod, which can affect movement of the master piston. In one embodiment, the master piston and the slave piston are arranged such that in their respective cylinder chambers, the slave piston is pushed in an opposite direction of the master piston when the master piston is pushed. In this manner a very compact design of the brake cylinder housing is achieved.

In an alternative embodiment the brake cylinder of the brake cylinder system comprises a master cylinder chamber and a slave cylinder chamber which are arranged separately, i.e. that are not integrated in the same brake cylinder housing. The working principle of the braking system remains the same. In such a case the master brake cylinder chamber and the slave cylinder chamber will be in fluid communication through one or more external channels. While less compact such a solution with two separate chambers provide more flexibility in the placement of the chambers as may be needed for space constraints at the simulation set-up.

In one embodiment of the brake cylinder, the master cylinder is arranged with an internal master cylinder rod engaging with a cavity in the master piston and with a master cylinder spring surrounding the internal master cylinder rod at least along the length of the rod. The internal master cylinder rod may be attached to the master cylinder at the opposite end of the entrance of the master cylinder rod connected to the brake pedal. The master cylinder rod extends along the length of the master cylinder chamber into a cavity of the master piston that extends into the master cylinder rod. The internal master cylinder rod is surrounded by a master cylinder spring along its entire length and the master cylinder spring continues into the cavity of the master cylinder rod connected with the brake pedal. Thus, the master cylinder spring may serve to bring the brake pedal back to its initial position after it has been pushed. Together the internal master cylinder rod and the master cylinder spring serve to control the movement of master piston in the master cylinder chamber.

In one embodiment the slave cylinder is arranged with an internal slave cylinder rod engaging with a cavity in the slave piston and with a slave cylinder spring surrounding the internal slave cylinder rod at least along the length of the rod. The internal slave cylinder rod may be attached to the slave cylinder at the end toward which the slave piston is moved when the brake is depressed. The slave piston element is connected with a damping system via a slave cylinder rod. The internal slave cylinder rod is surrounded by a slave cylinder spring which serves to bring the slave piston back to an unloaded position after the brake has been released. In combination, the internal slave cylinder rod and the slave cylinder spring serve to control the movement of slave piston in the slave cylinder chamber. In one embodiment, the slave cylinder spring and the internal slave cylinder rod continue into at least a part of the cavity in the slave piston. The slave cylinder spring may also continue into a cavity in the slave cylinder rod. Thus, the slave cylinder spring may serve to control the movement of the slave cylinder rod.

The unloaded position is considered the default position of the brake cylinder system as well as for the brake pedal; this can also be considered the released orientation of the system. The terms "default position", "unloaded position" and "released orientation" will be used interchangeably throughout the application. This unloaded default position is also considered the first position of the system, hence when the system is in the unloaded position or default position of the system, the master piston is in the first master position and the slave cylinder is in the first slave position.

The master cylinder chamber may include a stop for stopping the master piston. The stop may be mounted at the opposite end of the entrance of the master cylinder rod. Thus, the stop is mounted at the same end in the master cylinder chamber as the internal master rod. The stop may surround the spring and the internal rod along its length.

In other variants the end wall of the master cylinder chamber may function as a stop for the master cylinder piston element and no additional master cylinder stop member is necessary in the master cylinder chamber.

The position where the master is in contact the stop or the end wall, i.e. via contact between the piston element and the stop or end wall, the master piston is in the second master position.

Also, the slave cylinder chamber may include a stop for stopping the slave piston. However, this stop is mounted in the opposite end of where the internal slave rod is mounted. The stop serves to stop the movement of the slave piston in the direction of the dampening device.

In other variants the end wall of the slave cylinder chamber may function as a stop for the slave cylinder piston element and no additional slave cylinder stop member is necessary in the slave cylinder chamber.

The position where the slave piston is in contact with the stop, i.e. the slave cylinder stop member, or the end wall or the movement of the slave cylinder is stopped by the mechanical contact between a mechanical stop of a block connected to the slave cylinder rod, the slave piston is in the second slave position. It is to be understood that a damper piston is a specific variant of a block. Both the block and the damper piston serve the purpose of contacting and compressing the dampener as well as comprising the mechanical stop they are simply adapted differently to suit the embodiment of the cylinder they are used with.

Throughout the application the term "in front of" may be used, e.g. that fluid is in front of the master cylinder piston element. By in front of/the front is understood the end towards which the master cylinder piston element moves when the pedal is being depressed. This front end is considered the first end of the master cylinder chamber.

As mentioned above, the cylinder chambers are separated by a wall with openings that allow fluid to pass from the master cylinder chamber to the slave cylinder chamber (the fluid can also pass through these openings from the slave cylinder chamber back into the master cylinder chamber). In one embodiment of the brake cylinder, the wall includes only one opening which may be located both (i) next to the stop for stopping the master piston in the master cylinder chamber and (ii) next to the stop for stopping the slave piston the slave cylinder chamber. In this configuration, the opening is not blocked by the pistons, and the fluid may flow freely between the master cylinder chamber and the slave cylinder chamber (thereby, improving the operation of the brake cylinder). Both the master piston and the slave piston may be configured with recesses or rims having reduced cross section to allow flow of fluid to and from the opening.

In configurations where there is no separate stop element in the master cylinder chamber and/or the slave cylinder chamber the one or more openings will similarly be located both (i) next to the end wall at the first end of the master cylinder chamber and (ii) next to the end wall of the first end of the slave cylinder chamber. In this configuration, the opening is not blocked by the pistons, and the fluid may flow freely between the master cylinder chamber and the slave cylinder chamber (thereby, improving the operation of the brake cylinder). Both the master piston and the slave piston may be configured with recesses or rims having reduced cross section to allow flow of fluid to and from the opening.

In variants where the fluidic communication between the master cylinder chamber and the slave cylinder chamber is affected by another channel than the one or more openings in the wall dividing the chambers, the inlet and outlet of this channel in the master cylinder chamber and slave cylinder chamber respectively is located in the same manner as described for the location of one or more openings. That is to say that the channel inlet will be next to the master cylinder stop member or end wall at the first end of the master cylinder chamber, while the outlet will be next to the slave cylinder stop member or end wall at the first end of the slave cylinder chamber.

In one embodiment of the brake cylinder, the slave cylinder chamber communicates with a pressure sensor. The pressure sensor measures the pressure of the fluid in the slave cylinder chamber and converts this measurement into an electronic signal to be used for signaling the braking to the simulator software.

To obtain a more realistic or natural feeling of the brake, the brake cylinder may include a dampening device, and in one embodiment, the slave piston communicates with the dampening device. In one embodiment, the dampening device is located outside the slave cylinder chamber and communicates with the slave piston via a slave cylinder rod. In one embodiment, the dampening device includes a damper in a damper housing which cooperates with a block element connected with the slave cylinder rod. When the slave piston is activated, the block element is drawn towards the damper by the slave cylinder rod and applies pressure on the damper. The damper is capable of deforming when pressure is applied, thereby providing a dampening effect.

In one embodiment, the damper housing is located outside the slave cylinder chamber in a manner where it is coaxially adjacent to the slave cylinder chamber.

In one embodiment, the block element has an edge or a protrusion limiting how far the block element can move into the damper house and thereby how far the brake pedal can be pressed. The edge or protrusion forms a mechanical stop between two solid components of the brake cylinder causing a hard limit to the movement of the block element. The edge or protrusion is also found in alternative versions of the block elements such as the equivalent damper piston and the effect of creating a mechanical stop against another surface of the brake cylinder is the same.

Having a mechanical stop blocking the piston movement of the block element or damper piston enables the braking process to be divided into two phases. During the first phase of the braking process, i.e. before the mechanical stop is contacted, the pedal can be moved. During the second phase of the braking process, i.e. once the stop is contacted, the mechanical stop limits the further movement of the pedal. In different embodiments the brake cylinder is configured such that the length of the first phase can be adjusted, by adjusting the distance the pedal has to travel before the mechanical stop is contacted. This is equivalent to the feeling of a real pedal in a car where the resistance will change during the braking process.

The benefits of two-phase braking are achieved by the presence of a mechanical stop regardless of whether the master cylinder chamber and the slave cylinder chamber of the brake cylinder are integrated or whether they are two separate chambers connected by an external channel.

The benefits of two-phase braking are achieved by the presence of a mechanical stop are achieved both in a hydraulic braking system and in a purely mechanical braking system with a single cylinder.

In alternative embodiments based on the same underlying principle, the dampening device may include a damper in a damper housing which cooperates with a damper piston physically connected with the slave cylinder rod. When the slave piston is activated, the damper piston is pushed towards the damper by the slave cylinder rod and applies pressure on the damper. Hence, the damper piston is a specific variant of a block element in contact with the slave cylinder piston, which is arranged to push against the damper rather than drawing on the damper, but both components have the same effect in that they are means for transferring force from the slave cylinder to the damper. The damper is capable of deforming when pressure is applied, thereby providing a dampening effect.

In the two-phase braking system with a damper and a mechanical stop, the damper will provide resistance in the first phase as the pedal moves and the resilient material of the damper is compressed. In the second phase the damper remains compressed and the movement of the pedal is stopped by the mechanical stop.

Throughout the application the terms damper and dampener will be used interchangeably to describe the damper element of the dampening device.

In one embodiment, the damper is made from an elastomer material, such as nitril, silicone, fluorosilicone, neoprene, polyacrylate, polyurethane, polyisoprene, and similar material. In one embodiment, the dampener has a Shore A hardness in the range 30 to 90, such as in the range 40 to 80 when measured according to ASTM D2240. A hardness within such ranges provides a feeling in the brake pedal similar to the feeling of a brake pedal in a vehicle.

In another variant the damper is made from a spring such as a compression spring or a disc spring.

An alternative embodiment of the braking system comprises a mechanical braking cylinder, which functions without the need of a fluid within the brake cylinder. Such a mechanical brake cylinder of a mechanical braking system needs only a single cylinder chamber. Such a mechanical brake chamber has a cylinder rod entering at a first end and a damper located at an opposite second end. In such an arrangement pressing the pedal allows movement of the cylinder rod towards the damper which is then compressed. The mechanical brake cylinder further comprises a mechanical stop, such that the mechanical brake cylinder provides a two-phase braking process. The mechanical brake cylinder is a more simplified structure than the brake cylinder with two chambers and can be made more cheaply.

The present invention also relates to a brake system comprising a brake cylinder as described above for gaming and simulation.

BRIEF DESCRIPTION OF THE DRAWINGS

The accompanying drawings, which are incorporated in and constitute a part of this disclosure, illustrate various embodiments and aspects of the present disclosure. In the drawings.

DETAILED DESCRIPTION

Figure 1:
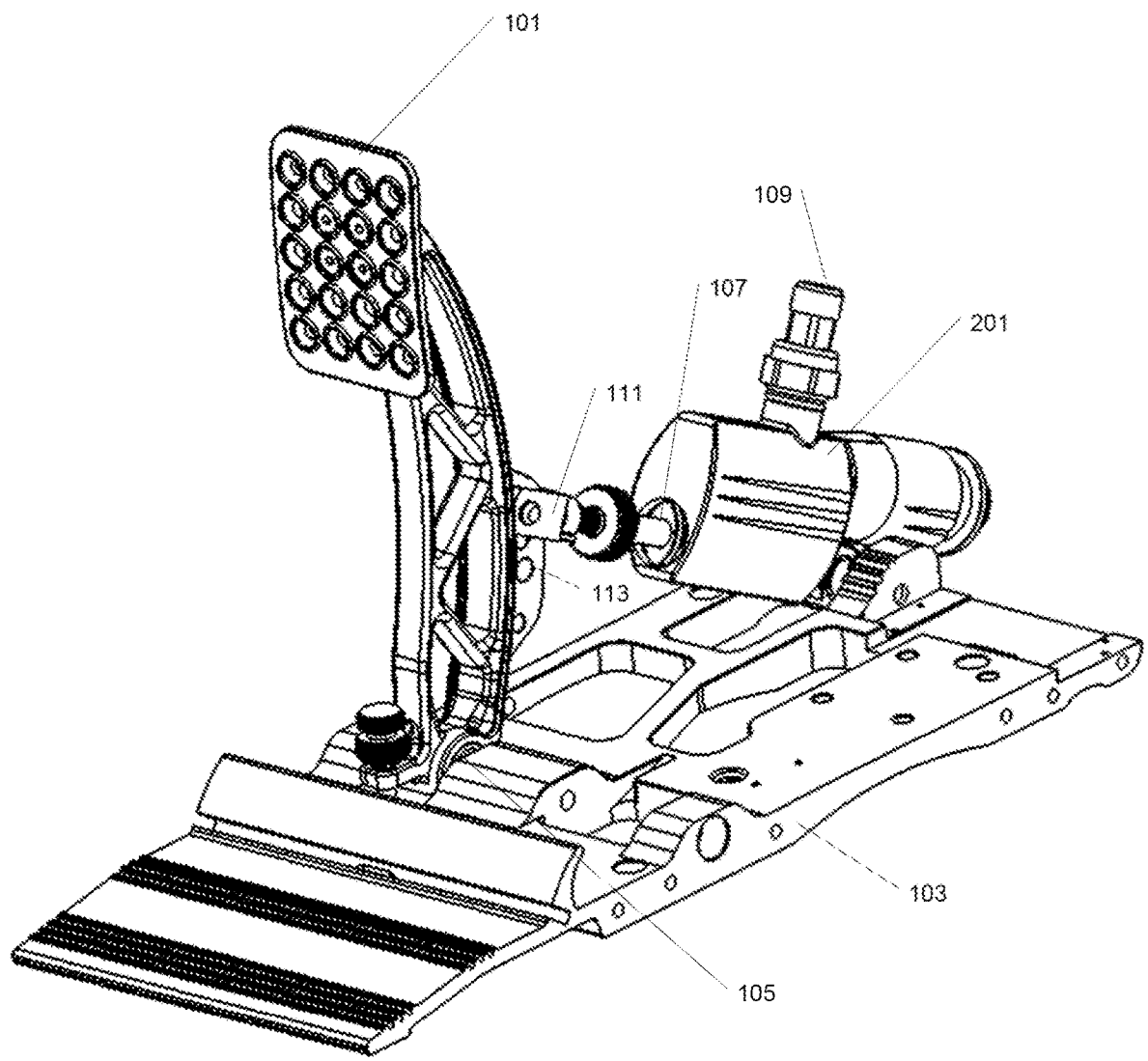
FIG. 1 illustrates a perspective view of a brake system with a brake cylinder according to an embodiment consistent with the present disclosure.

The following detailed description refers to the accompanying drawings. Wherever possible, the same reference numbers are used in the drawings and in the following description to refer to the same or similar parts. While several exemplary embodiments and features of the disclosure are described herein, modifications, adaptations, and other implementations are possible without departing from the spirit and scope of the disclosure. For example, substitutions, additions, or modifications may be made to the components illustrated in the drawings, and the exemplary methods described herein may be modified by substituting, reordering, or adding steps to the disclosed methods. Accordingly, the following detailed description does not limit the disclosure. Instead, the proper scope of the disclosure is defined by the appended claims.

Systems and devices consistent with the present disclosure generally relate to a brake cylinder. More particularly, systems and devices consistent with the disclosure relate to a brake cylinder for use in automotive simulators that is both cost effective to produce and provides authentic feedback when in use.

FIG. 1 illustrates an embodiment of brake system for use in an automotive simulation system such as a racing video game simulator or a professional racecar driver training simulator. The brake system includes a brake pedal 101 connected to a brake cylinder 201. The brake pedal 101 and brake cylinder 201 are mounted to a base or support surface 103. In some embodiments, the brake pedal 101 is mounted via a pivot axis 105 on the base 103 having a large surface area and weight to ensure that the brake system is supported in a stable manner.

The brake system is configured to communicate with a computer system running car simulation software. Communication between the brake system and the computer system could be via wires such as USB or via wireless communication such as Bluetooth. The communication between the brake system and the computer system may be in real-time to ensure that any actions on the brake pedal are immediately communicated to the car simulation software to minimize lag time and provide a realistic feel for the user using the simulation software. When pressing the brake pedal 101, a master cylinder piston 107 is pushed into the brake cylinder 201 and the brake pressure is then measured and communicated back to the computer system via the sensor 109. The sensor 109 is able to detect when, how much, and how fast pressure on the brake pedal is changed. The brake cylinder 201 is connected to the brake pedal 101 by a rod clevis 207 at the end of the piston rod 205 of the master cylinder piston 107 which grips around a mount plate 113 on the arm of the brake pedal 101.

A rod clevis 207 is a specific example embodiment of a brake cylinder connector, and the two terms will be used interchangeably and uses the same reference number 207.

Figure 2A:
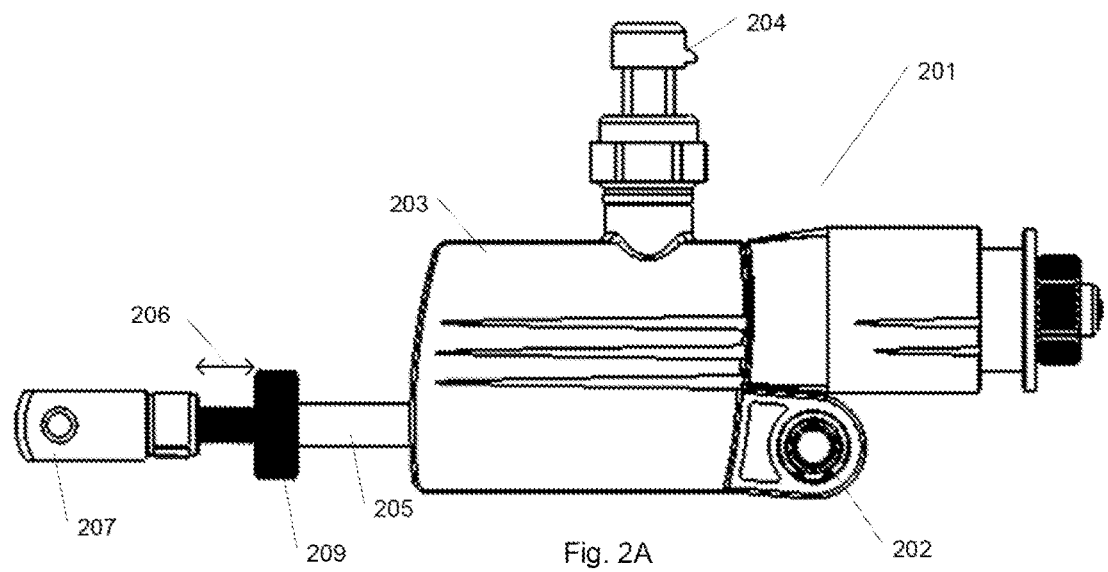
FIGS. 2A and 2B illustrate respectively a side view of the brake cylinder of FIG. 1 and a cross section of the brake cylinder of FIG. 1.
Figure 2B:
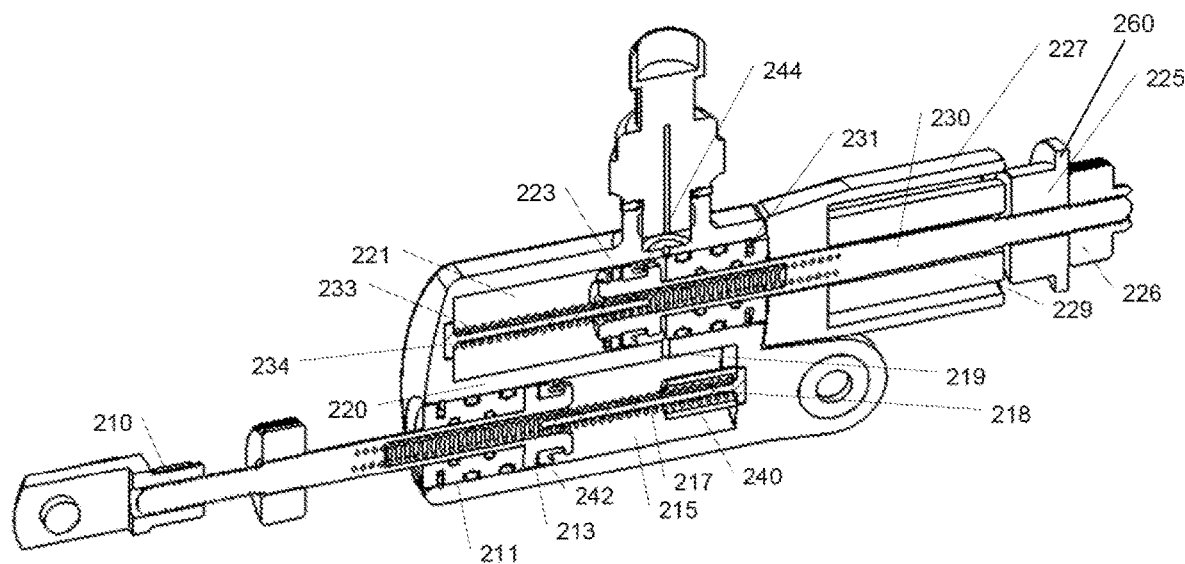

FIGS. 2A and 2B illustrate external and internal components of the brake cylinder 201. As seen in FIG. 2A, the brake cylinder 201 includes a brake cylinder housing 203 and an attachment opening 202 which can be used for mounting the brake cylinder 201 to a support system of the brake system such as the base 103. Further, at the top of the brake cylinder 201, a pressure sensor 204 is mounted for measuring pressure within the brake cylinder 201 and converting a pressure measurement into an electronic signal that can be sent to a processor of the automotive simulation system and be interpreted using the simulator software run on the processor to indicate the amount braking that should be applied to a vehicle simulated by the automotive simulation system (the electronic signal could be communicated either wireless or via wires).

As seen in FIG. 2A, attached through a lower part of the brake cylinder housing 203, a master cylinder piston 107 includes a master cylinder rod 205, a brake pedal connector 207, and a brake arm adjuster 209. The brake cylinder 201 is connected to the brake pedal 101 via the brake pedal connector 207 which may be in the form of, for example, a rod clevis. The brake arm adjuster 209 may be used for adjusting the slack in the pedal by increasing or decreasing the distance between the rod 205 and the connector 207 and for adjusting the position of the pedal 101 when not being pressed. The brake arm adjuster 209 can be used for adjusting the length of the master cylinder rod 205 by screwing the winding 210 at the end of the rod 205 either into or out of the winding 210 at the inner part of the rod clevis 207. When depressing the pedal 101 (as seen in FIG. 1) connected to the master cylinder rod 205 via the adjuster 209 and the connector 207, the master cylinder piston 107 is pushed into the brake cylinder housing 203 increasing the internal pressure of the brake cylinder 201.

It is the pressure increase in internal pressure caused by the depression of the pedal 101 which may be detected by a pressure sensor 204.

As seen in FIG. 2B, a master cylinder rod guide 211 is mounted inside the housing 203 for guiding the master cylinder rod 205 of the master cylinder piston 107 and allowing movement of the rod 205 only in an axial direction. The end of the master cylinder rod 205 disposed within the housing 203 includes a piston element 213 with a seal 242. The piston element 213 can move back and forth inside a master cylinder chamber 215 where a fluid (e.g., oil or other liquid) is present. The movement of the master cylinder piston element 213 is limited by the rod guide 211 and the stop member 240 at the opposite end of the master cylinder housing 203. The stop member 240 is to ensure that fluid cannot enter from the slave cylinder chamber 221 and behind the piston element 213. The stop member 240 should therefore have a length ensuring that the master piston 107 cannot be pressed to pass the openings 219 between master and slave chambers 215, 211. A master cylinder spring 217 is also present (where one end is inserted into a hollow end of the master cylinder rod 205 and the opposite end is inserted into the hollow stop member 240) that, when compressed, applies pressure between the stop member 240 and the rod 205 ensuring that the master cylinder piston element 213 moves back to a position associated with a released orientation when pressure on the pedal 101 has been released. The master cylinder spring 217 is mounted on an internal master cylinder rod guide 218 to keep the master cylinder spring 217 in place.

As seen in FIG. 2B, the cylinder 201 additionally includes a slave chamber 221. The slave chamber 221 and the master cylinder chamber 215 are elongated cavities that are disposed substantially parallel to each other and are separated from each other by a chamber dividing wall 220. One or more openings 219 are disposed within the wall 220 to allow for fluid communication between the master cylinder chamber 215 and the slave chamber 221.

When the master cylinder piston element 213 is pressed towards the fluid inside the master cylinder chamber 215 (such as in the situation depicted in FIGS. 4A and 4B), then the fluid in the chamber 215 is forced through the one or more openings 219 in the wall 220 between the two chambers 215, 221 and into the slave cylinder chamber 221. Fluid entering the chamber 221 via the one or more openings 219 increases the pressure within the chamber 221 and pushes a slave cylinder piston element 223 connected to a slave piston rod 230 in a direction opposite that of the master cylinder piston element 213. The dimensioning and number of openings 219 should be considered to ensure a sufficient flow between the two chambers 215, 221 when fluid is pressed from the master chamber 215 to the slave chamber 221. If the passage between the two chambers 215, 221 is too small, then a high-pressure force is necessary to press fluid from the master chamber 215 to slave chamber 221. In one embodiment two openings 219 each having a diameter of around 1.5 mm may be used, but these openings 219 may be larger or smaller depending on the viscosity of the fluid.

The piston seal 242, 244 for each of the master cylinder piston element 213 and the slave cylinder piston element 223 may be a u gasket. When fluid is being pressed, the lips of the u gaskets 242, 244 are pressed towards the inner walls of the cylinder chambers 215, 221. As can be seen, the u gasket 244 of the slave piston element 223 is mounted opposite the u gasket 242 of the master piston element 213, since in the master cylinder chamber 215 the fluid is in front of the piston element 213, whereas in the slave cylinder chamber 221 fluid is between the slave piston element 223 and the slave rod guide 231. Due to the u gaskets' 242, 244 seal, air is present in the master chamber 215 behind the master cylinder piston 107 and in front of the slave cylinder piston 223. In the slave chamber 221, a hole should be present at the end to ensure air is allowed to leave and enter the chamber 221 as the slave piston 223 moves back and forth.

The end of the slave piston rod 230 distal to the master cylinder piston 107 is connected to an end bolt 226 and a block element 225 via windings at the end of the slave cylinder rod 230. When the slave cylinder piston 223 is pushed by the fluid entering the slave cylinder chamber 221, the block element 225 is dragged towards and into a brake cylinder damper housing 227 and moves with the piston 223 back and forth based on pressure provided by the fluid entering the slave cylinder chamber 221. Inside the damper housing 227, a dampener 229 is positioned between the block element 225 and an inner wall of the housing 227. The dampener 229 is made from flexible, elastic material (e.g., rubber, silicone, etc.), where the flexibility of the elastic material influences the perceived softness of the pedal 101 in use. For example, a dampener 229 with greater flexibility will result in the pedal 101 being perceived as softer than when a stiffer dampener 229 with less flexibility is used. Additionally, a threaded nut may be included on the slave piston 223 next to the block element 225 on the opposite side of the dampener 229. Manipulation of the threaded nut may be used to adjust the stiffness of the brake pedal 101. The block element 225 has an edge limiting how far the block element can move into the damper house and thereby how far the brake pedal can be pressed.

By the optional threaded nut being placed next to the block element 225 on the opposite side of the dampener 229 is understood that the block element 225 is arranged between the threaded nut 226 and the dampener 229. This threaded nut 226 is also called the end bolt 226. The arrangement of the end bolt 226 affects the default position of the block element 225 as screwing the bolt further onto the windings of the slave cylinder rod 230 such that the end bolt 226 is closer to the dampener 229 forces the end block 225 placed between the end bolt 226 and the dampener 229 towards the dampener 229. By changing the distance between the block element 225 and the damper housing, the travel range of the pedal in the first phase of the braking process is adjusted. The travel range is how far the pedal can be pressed before the mechanical stop 260 between the extending edge of the block element 225 and the damper housing 227 is engaged such that the further movement of the block element 225 is hindered whereafter the second phase of the braking process begins. During the movement of the block element 225 the dampener 229 is being deformed and the user needs to apply force to the brake pedal 101 to cause this deformation, this will give the user a feeling of resistance in the pedal. Once the edge of the block element is in contact with the damper housing 227 the resistance is no longer caused by the deformation of the dampener 229, but will be the hydraulic pressure related to compression of the fluid in the brake cylinder 201. Hence, the arrangement which allows the block element 225 to travel a distance before contacting the damper housing 227 gives the user a more realistic brake feel with two stages having significantly different resistance, i.e. requiring significantly different force to be applied by the user to the pedal. In the second phase the user will not feel the pedal move even as the pressure rises and detects increased braking force.

In the slave cylinder chamber 221, a slave rod guide 231 is mounted inside the housing 203 for guiding the rod of the slave piston 223 and allowing movement of the piston 223 in only the axial direction. The slave cylinder piston 223 can move back and forth inside the slave cylinder chamber 221 where the fluid (e.g., oil or other liquid) is present.

A slave cylinder spring 233 is also present that, when compressed, applies pressure between an inner wall of the chamber 221 and the piston 223 ensuring that the slave cylinder piston 223 moves back to a position associated with the released orientation when pressure on the pedal 101 has been released. The slave cylinder spring 233 is mounted on the internal slave cylinder rod guide 234 to keep the slave cylinder spring 233 in place.

As seen in FIGS. 2A and 2B, the pressure sensor 204 is connected to and is in fluid connection with the chamber 221 and is configured to measure the pressure in the chamber 221 between the slave cylinder piston 223 and the slave rod guide 231.

In other embodiments the pressure sensor 204 may be arranged to be in fluid connection with either the slave cylinder chamber 221 or the master cylinder chamber 215 at any position along the cylinder housing 203. In yet other embodiments the pressure sensor 204 mare be arranged spaced away from the cylinder housing 203 while still being in fluid connection with either the master cylinder chamber 215 or the slave cylinder chamber 221, e.g. by connection with a tube.

Figure 3A:
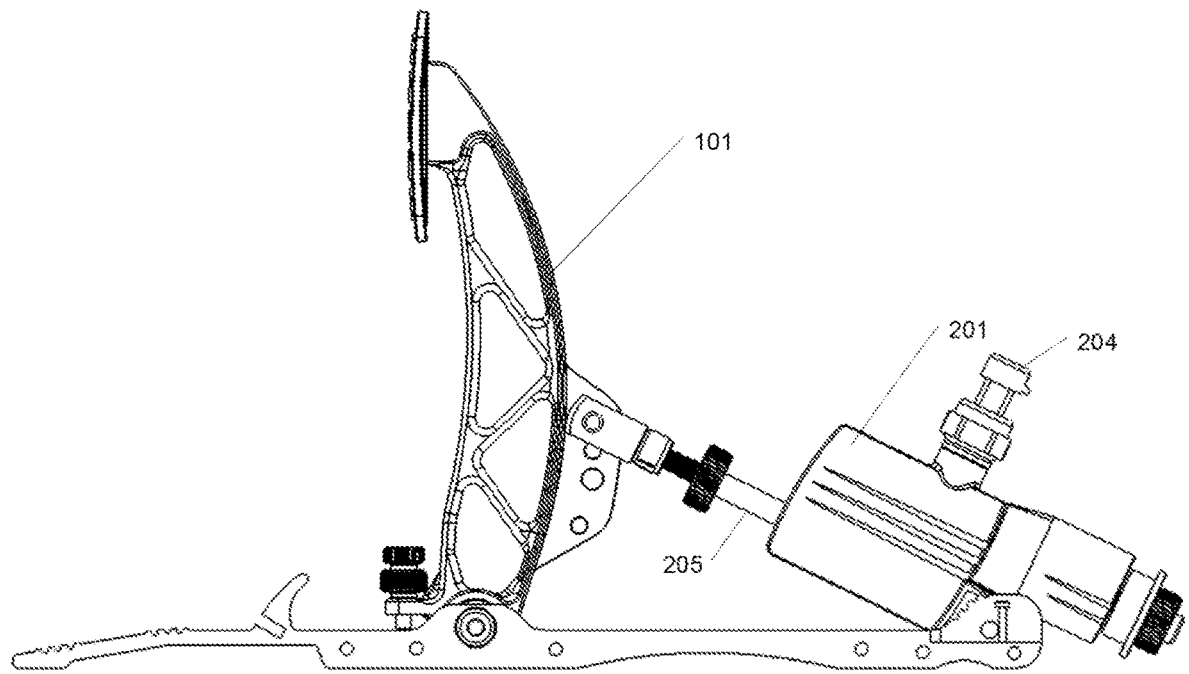
FIGS. 3A and 3B illustrate respectively a side view of the brake system of FIG. 1 in a released orientation and a cross section of the brake cylinder of FIG. 1 in the released orientation.
Figure 3B:
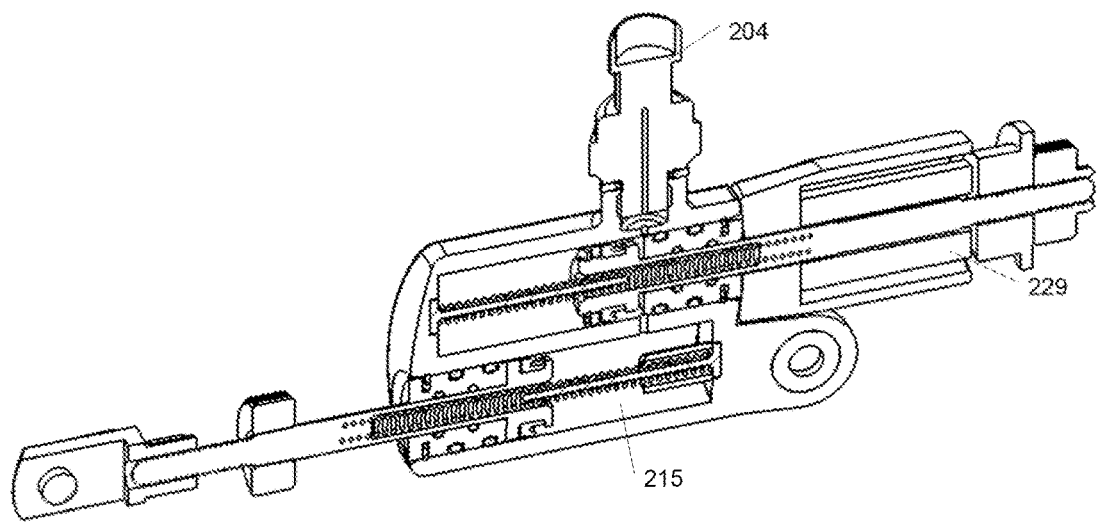

FIGS. 3A and 3B illustrates the brake system in the released orientation, where the pedal 101 is not pressed. As seen in FIG. 3A, the pedal 101 is connected to the master piston rod 205 but there is no pressure on the pedal 101. Consequently, since no pressure is applied to the master piston rod 205 from the pedal 101, the fluid remains in the master cylinder chamber 215 and does not pass through the holes 219 and into the slave cylinder chamber 221. Accordingly, since no fluid is added to the chamber 221 from the chamber 215, the pressure sensor 204 measures no increased level of pressure. Because the pressure sensor 204 does not measure an increased level of pressure in the chamber 221, the processor of the automotive simulation system does not receive any signal indicative of braking.

Figure 4A:
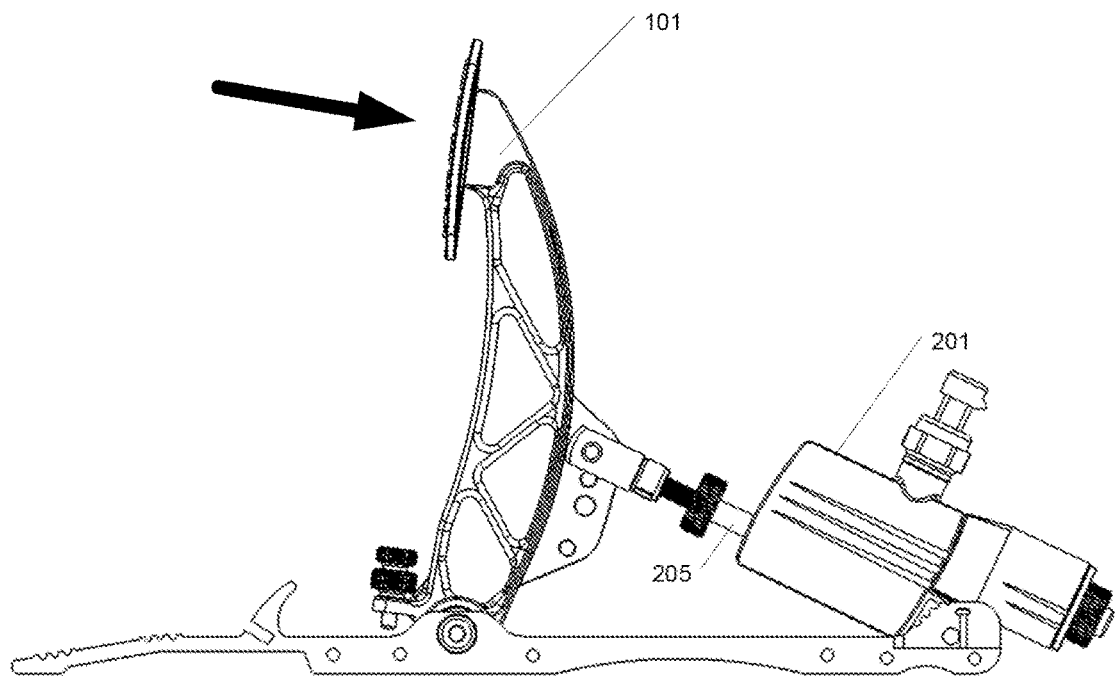
FIGS. 4A and 4B illustrate respectively a side view of the brake system of FIG. 1 in a depressed orientation and a cross section of the brake cylinder of FIG. 1 in the depressed orientation.
Figure 4B:
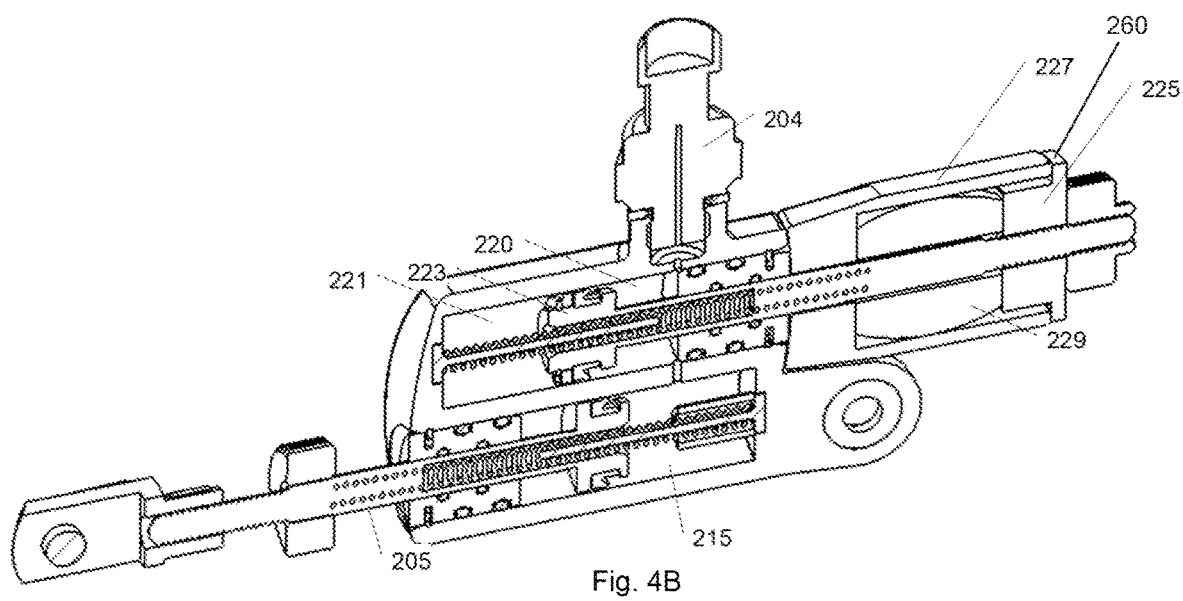

FIGS. 4A and 4B illustrates the brake system in a depressed orientation, where the pedal 101 is pressed.

As seen in FIG. 3A, the pedal 101 is connected to the master cylinder piston rod 205 and there is pressure on the pedal 101 (illustrated by black arrow). Consequently, since pressure is applied to the master piston rod 205 from the pedal 101, the fluid is pushed from the master cylinder chamber 215, through the holes 219, and into the slave cylinder chamber 221. Accordingly, since fluid has been added to the chamber 221 from the chamber 215, the slave cylinder piston 223 is pushed and an increased pressure of fluid in the area 221 in front of the slave cylinder piston 223 is measured by the pressure sensor 204. By means of the slave cylinder rod 230, when the slave piston 223 is pushed, it drags the block element 225 into the damper housing 227 and applies compressive pressure onto the dampener 229. The increased pressure causes the dampener 229 to deform which affects the movement of the slave cylinder piston 223 which again affects the entire brake system providing a feeling corresponding the feeling of a brake system in a vehicle. The deformation of the dampener 229 is an elastic deformation, and when the pressure is released, the dampener will regain its initial shape (i.e., the shape of the dampener 229 in an unloaded condition). Further the pedal 101 can be pushed no further due to the edge of the block element 225 being blocked by the edge of the damper housing 227. The resistance of the dampener 229 is felt by a user's foot on the pedal 101 and provides a tactile feedback similar to a brake of a real car. Because the pressure sensor 204 does measure an increased level of pressure in the chamber 221, the processor of the automotive simulation system receives a signal from the sensor 204 indicative of braking. Because the amount of increased pressure measured by the sensor 204 can vary with the amount of pressure applied by a user's foot on the pedal 101, the signal from the sensor will be indicative of the amount of braking that a user is applying to the pedal 101.

The principle described can be equivalently employed in a braking system wherein the master cylinder chamber 215 and the slave cylinder chamber 221 are physically separated, i.e. not built into the same cylinder housing 203. In such embodiments the master cylinder chamber 215 and the slave cylinder chamber 221 are connected by an external channel rather than a hole in a shared wall as they do not need to share a wall. The working principle of exchange of fluid between the chambers 215,221 and the movement of the cylinder rods 205,230 remains the same as will be apparent to one skilled in the art.

Figure 5A:
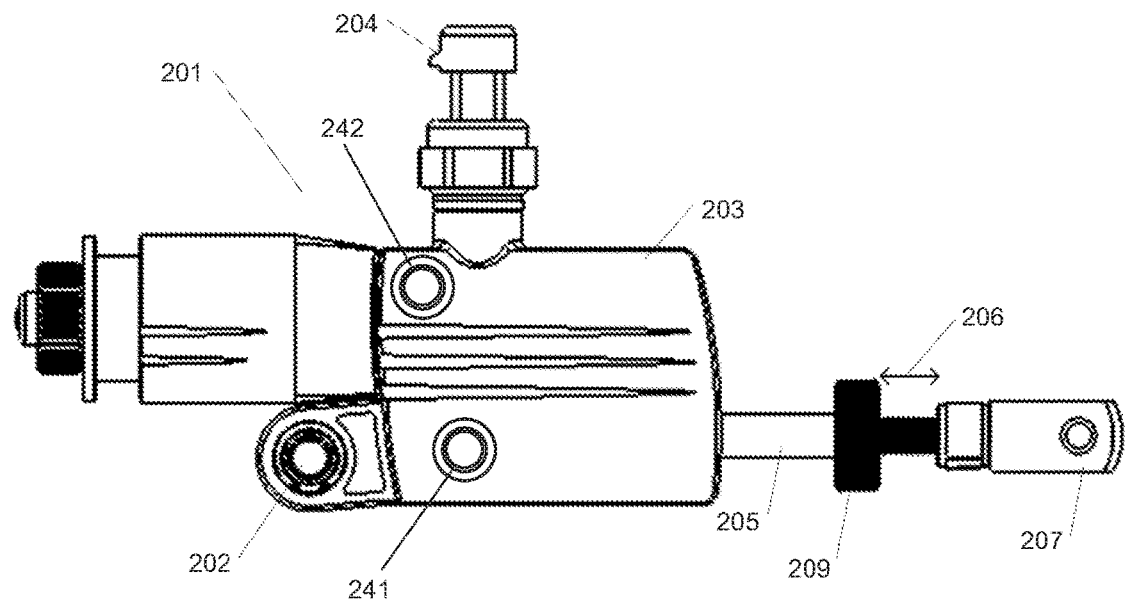
FIGS. 5A and 5B illustrate respectively a side view of a brake cylinder according to an alternative embodiment of the brake cylinder of FIG. 1 in the released, default orientation and a perspective cross section of that embodiment of the brake cylinder.
Figure 5B:
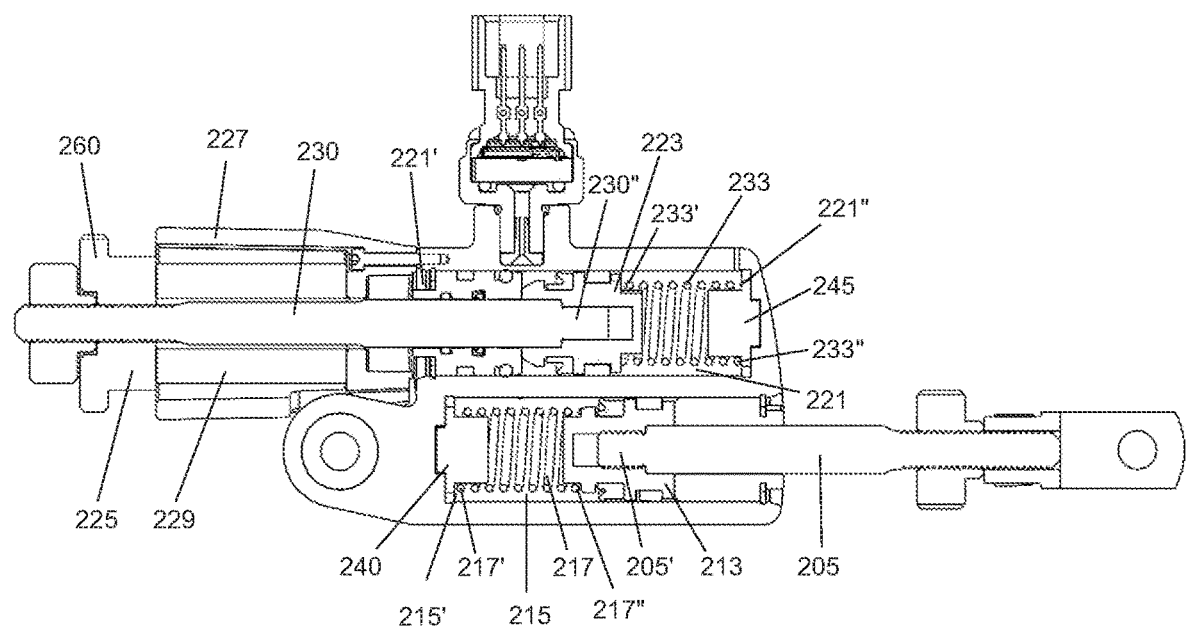

FIGS. 5A and 5B illustrates an alternative embodiment of the brake cylinder 201. In FIG. 5A shown from the outside and in FIG. 5B shown in schematic cross-sectional view. The working principle is the same as in the previously described embodiments, the FIGS. 5A and 5B simply illustrate alternative arrangements of some of the features of the brake cylinder 201 and they may be used either in combination as in the illustration or having either separately incorporated in the previously described embodiments.

FIG. 5A illustrates a brake cylinder 201 for use with a pedal 101 of a brake system for driving simulation according to the invention. Same as for the other example embodiments the brake cylinder 201 comprises a cylinder housing 203, an attachment opening 202 for connecting the brake cylinder 201 to a support surface 103, and a master cylinder rod 205 for connecting the brake cylinder 201 to a brake pedal 101 via a brake pedal connector 207. In an embodiment the master cylinder rod 205 is connected to the brake pedal connector 207 via a brake arm adjuster 209 which has a winding allowing for the adjustment of the distance 206 between the brake cylinder rod 205 and the brake pedal connector 207. In other embodiments the brake cylinder rod 205 and brake pedal connector 207 may be connected by other means such as but not limited to the master cylinder rod 205 and the brake pedal connector 207 being integrated, being welded together or releasably connected through winding or being screwed together by a transverse screw and bolt.

In some embodiments as illustrated in FIG. 5A the brake cylinder 201 is equipped with a first external channel connecter 241 for fluidically connecting a first end of an external channel (not shown) to the master cylinder chamber 115 and a second external channel connector 242 for fluidically connecting a second end of an external channel (not shown) to the slave cylinder chamber 221. In some embodiments the external channel is a tube directly connecting the first 241 and second external channel connector 242 and enabling the exchange of fluid between the master cylinder chamber 215 and the slave cylinder chamber 221. In some embodiments an external channel connected to the first external channel connector 241 and the second external channel connector 242 replaces the one or more holes 219 while serving the same purpose of enabling fluid exchange between the chambers 215,221 when pressure is applied and the master cylinder piston element moves. In other embodiments the brake cylinder 201 may comprise a first external channel connector 241, a second external channel connector 242 and an external channel in addition to one or more holes 119 in the separating wall 220 between the master cylinder chamber 115 and the slave cylinder chamber 221. The number and dimensioning of the external channel and/or the one or more holes 119 may be adapted between different embodiments of the brake cylinder 201 to control the flowrate and resistance of the system. In some embodiments the external channel may connect the master cylinder chamber 215 and the slave cylinder chamber 215 via one or more other pieces of equipment such as but not limited to diagnostics tools, pressure sensors and/or filters.

FIG. 5B illustrates an embodiment having a solid separating wall 220, separating the master cylinder chamber 15 and the slave cylinder chamber 221, by solid is understood that the wall does not have one or more holes or other breaches allowing fluid communication between the chambers 115,221 through the separating wall 220. In such an embodiment the master cylinder chamber 215 and the slave cylinder chamber 221 are in stead in fluid communication through an external channel connected to the chambers via external chamber connectors (not visible in the cross-sectional view). In an embodiment the first external channel connector connects the external channel to the master cylinder chamber 215, near the first end of the master cylinder chamber 215', that is between the master cylinder piston element 213 and the end wall at the first end of the master cylinder chamber 215'. In an embodiment the second external channel connector connects the external channel to the slave cylinder chamber 221 near the first end of the slave cylinder chamber 221, i.e. between the slave piston element 223 and the damper housing 227.

The embodiment illustrated in FIG. 5B further differ from the previously illustrated embodiments in that the master cylinder rod 205 is solid and that the piston element 213 is releasably connected to the master cylinder rod 205 by means of an external winding on the first end of the master cylinder rod 205' and an internal winding in a recess of the master cylinder piston element 213. In an alternative embodiment the master cylinder rod 205 may comprise a recess with internal winding which may connect to an external winding on a protrusion on the master cylinder piston element 213. In yet other embodiments the master cylinder rod 205 may be connected to the master cylinder piston element 213 by other known means such as a press fit or gluing.

In some embodiments the slave cylinder piston element 223 is similarly connected to the slave cylinder rod 230 by the second end of the slave cylinder rod 230" extending into a hollow of the slave cylinder piston element 223. In some variants the slave cylinder rod 230 will further be connected to the slave cylinder piston by a winding or by other known means of connection.

In some embodiment as illustrated in FIG. 5B a master cylinder spring 217 is arranged between the first end of the master cylinder chamber 115' and the master cylinder piston element 213. In an embodiment the first end of the master cylinder spring 217' is arranged to contact and be guided by a master cylinder stop member 240 arranged at the first end of the master cylinder chamber 215'. The master cylinder spring 217 may be guided by the master cylinder stop member 240 by being arranged such that at least part of the first end of the master cylinder spring 217' encircles the master cylinder stop member 240, in such an embodiment the master cylinder stop member 240 may be solid. Alternatively the master cylinder spring 217 may be guided by the master cylinder stop member 240 by having at least part of the first end of the master cylinder spring 217' arranged inside a hollow of the master cylinder stop member 204. The second end of the master cylinder spring 217" is arranged to contact the master cylinder piston element 213. In a variant at least part of the second end of the master cylinder spring 217" is arranged to encircle at least part of the master cylinder piston element 213 such that the master cylinder piston element 213 may act as a guide for the master cylinder spring 217. By something acting as a guide for a spring is understood that it limits the movement of the spring, such that the end of the spring does not significantly change position in the direction perpendicular to the axis of the chamber in which the spring is arranged.

In alternative embodiments wherein there is no master cylinder stop member, the first end of the master cylinder spring 217 is arranged to contact the end wall at the first end of the master cylinder chamber 217'. In such cases the first end of the master cylinder spring 217' may be mounted in or otherwise connected to the end wall at the first end of the master cylinder chamber 217'.

In some embodiments the slave cylinder spring 233 may similarly be mounted between the slave cylinder piston element 223 and the end wall at the second end of the slave cylinder chamber 221" or a slave cylinder stop element 245 mounted at said end wall. In an embodiment the slave cylinder spring 233 is mounted such that the first end of the slave cylinder spring 233' is guided by the slave cylinder piston element 223, e.g. by at least part of the first end of the slave cylinder spring 233' encircling at least part of the slave cylinder piston element 223. In an embodiment the second end of the slave cylinder spring element 221" is guided by a slave cylinder stop element 245, e.g. by at least a part of the second end of the slave cylinder spring element 221" being arranged to encircle at least a part of the slave cylinder stop element 245. In an alternative embodiment where there is no slave cylinder stop element 245 comprised in the slave cylinder chamber 221 the second end of the slave cylinder chamber spring 233" is mounted in or otherwise connected to the end wall at the second end of the slave cylinder chamber 221".

Same as for the previously described embodiments the brake cylinder 201 of FIGS. 5A-5B function by the exchange of fluid between the master cylinder chamber 215 and the slave cylinder chamber 221 and the increased pressure within the brake cylinder 201. Hence, it is understood that all the elements have the same functionality, i.e. the external channel has the same functionality as the one or more holes in the separating wall, the springs 217, 233 maintain the same functionality as does the differently mounted piston elements 213,223. Namely, when a user applies pressure to the pedal, pressure is transferred via the master cylinder rod 205 to the master cylinder piston element 213. The master cylinder piston element 213 compresses the master cylinder spring 217 and displaces fluid from the master cylinder chamber 215 through an external channel and into the slave cylinder chamber 221. In the slave cylinder chamber 221 the addition of the displaced fluid in turn moves the slave cylinder piston element 223 in direction of the second end of the slave cylinder chamber 221" compressing the slave cylinder spring 233. The slave cylinder piston element 223 being connected to the slave cylinder rod 230 causes movement of the slave cylinder rod 230 which in turn moves the block element 225 towards the dampener 229 causing elastic deformation of the damper 229. The action of the users applying pressure to the pedal causes an increase of pressure within the brake cylinder 201, which can be detected by a pressure sensor, which in turn can send a signal to the processing unit of a driving simulator. When the user releases the pressure on the pedal the forces of the compressed springs 215,233 will act upon the piston elements 213,223 moving them back to a default position associated with released orientation of the system.

As the effects of the components remain the same and interact in the same manner, in the various embodiment the skilled person would understand that it is possible to use these elements in combination without changing the essence of the invention and should not be construed as limited to the particular combinations shown in the illustrations. For example the spring arrangement illustrated in the embodiment of FIG. 5B may be used in a an embodiment having one or more holes in the separating wall 220, or either or both piston elements may be mounted to the master cylinder rod and/or the slave cylinder rod respectively in an embodiment having the spring mounted inside the hollow of the rod. In various embodiments the arrangement of rods, piston elements and springs are the same in both the master cylinder chamber 215 and the slave cylinder chamber 221, but in alternative variants the arrangement may differ in the two chambers.

In the embodiments illustrated in FIGS. 1-5 the master cylinder rod 205 and the slave cylinder rod 230 are arranged substantially parallel and at the same time staggered such that the slave cylinder rod 230 extends further towards the front than the master cylinder rod 205 does. In such a configuration the damper housing is arranged at the front end of the brake cylinder 201, i.e. connected to and extending from the first end of the slave cylinder chamber 221'. Such an embodiment may be considered a pull configuration as the depression of the pedal leads to the block element attached to the slave cylinder rod 230 being pulled towards the dampener 229.

In this embodiment, there is described an integrated hydraulic brake cylinder, i.e., integrated master cylinder and slave cylinder, where the slave cylinder comprises a slave piston that compresses a damper by pulling a flanged nut against the end of the damper. In this embodiment, the flanged nut on the backside determines the pre-load as well as when the flange touch the damper housing that defines a mechanical stop. While this embodiment, is described in terms of an integrated cylinders, it is also possible that it may be configured in a non-integrated cylinder, e.g., in separate master and slave cylinders.

Figure 6:
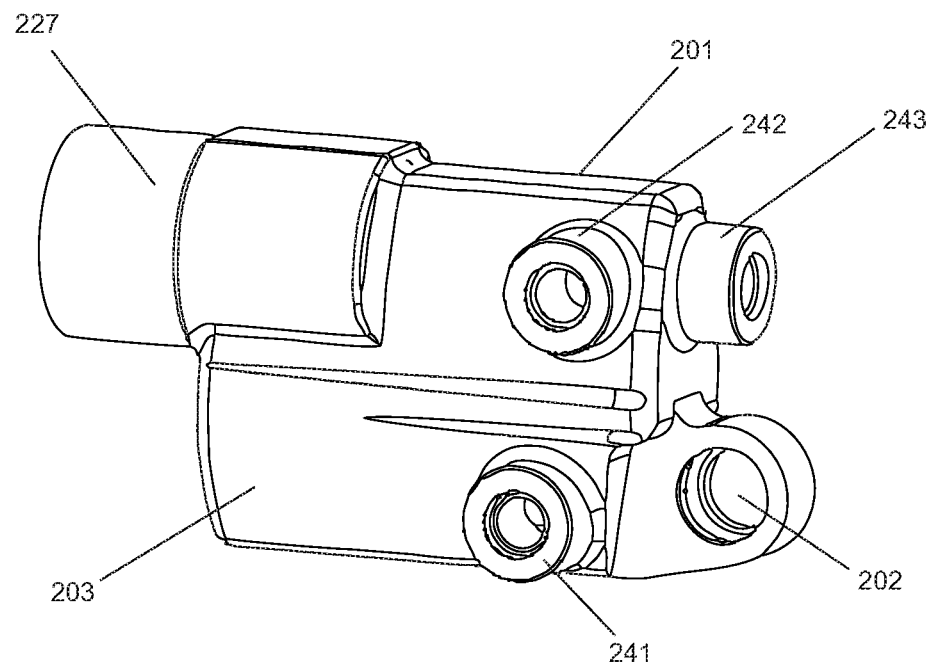
FIG. 6 illustrates an external view of an alternative embodiment of a brake cylinder having its damper housing on the opposite side of the attachment opening, which may replace the brake cylinder of FIG. 1 to be used with the same type of pedal.
Figure 7:
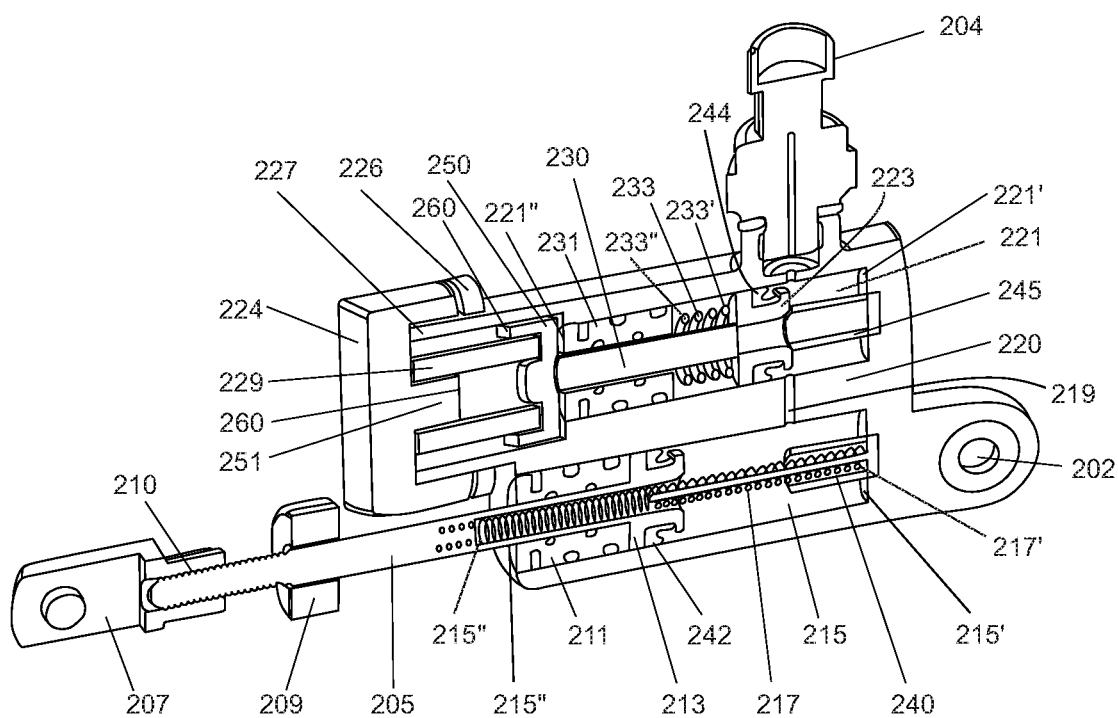
FIG. 7 illustrates a perspective cross section of an alternative embodiment of a brake cylinder which may replace the brake cylinder of FIG. 1 to be used with the same type of pedal, the cylinder is shown in the released orientation.

FIGS. 6 and 7 illustrate alternative embodiments of the brake system which is based on the same working principle but arranged in a push configuration, wherein depression of the brake pedal 101 and the displacement of fluid from the master cylinder chamber 215 to the slave cylinder chamber 221 leads to the slave cylinder rod 203 pushing the block element towards the dampener 229. In this embodiment, there is described an integrated hydraulic brake cylinder where the slave cylinder comprises a slave piston that pushes against and thereby compresses a damper. In this embodiment, inserts within the damper determines the mechanical stop, while a nut at the end of the damper housing determines the pre-load. While this embodiment is described in terms of an integrated cylinder, it is also possible that it may be configured in a non-integrated cylinder, e.g., in separate master and slave cylinders. In other words, in such a configuration the damper piston which may be seen as equivalent to the block element is positioned on the side of the dampener 229 facing the slave cylinder piston element 223. In such a push configuration damper housing may be arranged at the second end of the slave cylinder chamber 221", i.e. adjacent to the entry of the master cylinder rod 205 into the second end of the master cylinder chamber 215". A brake cylinder 201 according to the variant illustrated in FIGS. 6A and 6B may be used with a pedal 101 in the same manner as disclosed for the previous embodiments by replacing the brake cylinder 201 of the previous embodiment. In an embodiment of the push configuration brake cylinder 201 it comprises an attachment opening 202 for releasably connecting the brake cylinder 201 to a support surface 103 such as a mount plate 113 and a brake pedal connector 207, such as a rod clevis, for connecting the brake cylinder 201 to a mount plate 113 of the brake pedal 101.

FIG. 6 is an external view of a brake cylinder housing 203 having damper housing 227 arranged at the opposite end of the attachment opening 202. The illustrated embodiment comprises a first external channel connector and a second external channel connector for connecting an external channel for bringing a master cylinder chamber and a slave cylinder chamber in fluid communication. In the embodiment illustrated in FIG. 6 a pressure sensor may be connected in the external channel rather than directly to the cylinder housing 203. Alternatively, the pressure sensor may be connected directly to a chamber through the cylinder housing 203. It could for example be through an external connector 243 made in the housing for that purpose. It is to be understood that while the external connector 243 is in FIG. 6 shown as being connected to the slave cylinder chamber, the pressure sensor is not restricted to be connected to any particular chamber or in any particular position as the pressure in the closed hydraulic system remains the same through the system and may be measured at any point.

FIG. 7 is a schematic illustration of the internal component of an alternative embodiment of the brake cylinder 201.

As seen in FIG. 7 the brake cylinder 201 includes a brake cylinder housing. Similar to the other embodiments the brake cylinder housing comprises a master cylinder chamber 215 and a slave cylinder chamber 221, the two chambers 215,221 each being an elongated cavity which are disposed substantially parallel to each other. The master cylinder chamber 215 and the slave cylinder chamber 221 are separated by a chamber dividing wall 220. One or more openings 219 are disposed within the wall 220 to allow for fluid communication between the master cylinder chamber 215 and the slave chamber 221.

A master cylinder rod guide 211 is arranged for guiding a master cylinder rod 205 of the master cylinder piston and allowing movement of the rod 205 only in an axial direction. In some variants the master cylinder rod guide 211 may be mounted inside the master cylinder chamber 215 in some other variants the master cylinder rod guide 211 may be mounted adjacent to and/or abutting the master cylinder chamber. The first end of the master cylinder rod 205' is disposed within the master cylinder chamber 215 and contacts a piston element 213, the piston element 213 being equipped with a seal 242. In some variants the master cylinder rod 205 may be connected to the piston element 213, for example by means of threading allowing the piston element 213 to be releasably connected with the master cylinder rod 205 by screwing the piston element 213 onto the master cylinder rod 205. In other variants the master cylinder rod 205 may be abutting the piston element 213 and being arranged such that they may be in contact. The piston element 213 is adapted to move back and forth inside the master cylinder chamber 215 along the direction of the longitudinal axis of the master cylinder chamber 215. The master cylinder rod 205 is arranged such that the movement of the master cylinder rod affects the movement of the piston element 213. A stop member 240 may be located at the first end of the master cylinder chamber 215', i.e. the end of the master cylinder chamber 215 opposite the end at which the master cylinder rod 205 enters the master cylinder chamber 215 which in turn is the second end of the master cylinder chamber 215". The movement of the master cylinder piston element 213 is limited by the rod guide 211 and either the stop member 240 or the first end of the master cylinder chamber 215'. The rod guide 211 limits the movement of the master cylinder rod 205 to be along the axis of the master cylinder chamber 215. In embodiments having the stop member 240, it limits how far the master cylinder piston element 213 can travel inside the master cylinder chamber 215. In a variant the stop element 240 is adapted to ensure that the master cylinder piston element cannot move past the one or more openings 219 such that fluid from the slave cylinder chamber 221 cannot enter the master cylinder chamber 215 behind the master cylinder piston element 213. This is achieved by the length of the stop member 240 being such that it ensures that the master cylinder piston element 213 cannot be extended past the opening 219 between the master and the slave chambers 215, 211. In embodiments having no stop member 240, the distance which the master cylinder piston element 213 can travel is limited by the first end of the master cylinder chamber 215' and the dimensions of the piston element 213 itself, in particular the length of the piston element 213. In other variants of such embodiments with no stop member 240, the placement of the one or more openings 219 and the length of the piston element 213 are such that the entirety of the master cylinder piston element 213 cannot be extended past the opening 219 between the master and the slave chambers 215, 211 such that fluid cannot enter the space between the second end of the master cylinder chamber 215" and the master cylinder piston element 213.

A master cylinder spring 217 is arranged within the master cylinder chamber 215. A first end of the master cylinder spring 217' is disposed at the first end of the master cylinder chamber 215'. In some embodiments having a stopper member 240 arranged at the first end of the master cylinder chamber 215' the first end of the master cylinder spring 217' may be arranged within a hollow opening of the stop member 240. In other variants the embodiment having a stopper member 240 arranged at the first end of the master cylinder chamber 215' the first end of the master cylinder spring 217' may be arranged such that the first end of the master cylinder spring 217' encircles the master cylinder stopper member 240. In other embodiments wherein the master cylinder chamber 215 comprises no stopper member the first end of the master cylinder spring 217' is at least partially arranged within a cavity in the end wall of the first end of the master cylinder chamber 215'. In another variant the first end of the master cylinder spring 217' is arranged to abut the end wall at the first end of the master cylinder chamber 215'.

In some embodiments the second end of the master cylinder spring 217" opposite of the first end of the master cylinder spring 217' is disposed within a hollow opening of the master cylinder rod 205 such that at least part of the master cylinder spring 217 extends through the body of the master cylinder piston element 213.

In alternative embodiments the master cylinder rod 205 is solid and the second end of the master cylinder spring 217" is guided by the piston element 213. In such embodiments the second end of the master cylinder spring 217" may be arranged within a hollow section of the master cylinder piston element 213 such that at least part of the master cylinder spring 217 is encircled by part of the master cylinder piston element 213. In such a configuration the second end of the master cylinder spring 217" may abut the first end of the master cylinder rod 205' if a central channel extends throughout the body of the piston element 213, such a channel may for example be equipped with internal threading for connecting the piston element 213 to the master cylinder rod 205. In alternative variants of such embodiments the second end of the master cylinder spring 217" may be disposed to surround part of the master cylinder piston element 213. In these configurations, the master cylinder piston element 213 guides the second end of the master cylinder spring 217" by restricting its movement in the radial direction within the master cylinder chamber 215, that is in any other direction than the axial direction of the master cylinder chamber 215.

When force is applied to the master cylinder rod 205, i.e. when a user applies pressure to the pedal, such that the master cylinder rod 205 moves further into the master cylinder chamber 215, i.e. in the direction from the second end of the master cylinder chamber 215" towards the first end of the master cylinder chamber 215', the master cylinder spring 217 is compressed. The forces of the compressed master cylinder spring 217 applies force to the points of contact at the first 217' and second end of the master cylinder spring 217". At the first end of the master cylinder spring 217' pressure is applied to the contact point at the end of the master cylinder chamber 215', i.e. the stop member 240 or the end wall at the first end of the master cylinder chamber 215'. At the second end of the master cylinder spring 217" pressure is applied to the contact point at the master cylinder rod 205 and/or the master cylinder piston element 213 such that the spring force is applied to the master cylinder rod 205 either directly or transmitted to the master cylinder rod 205 via the master cylinder piston element 213.

The force from the master cylinder spring 217 acts upon the master cylinder rod 205 to move it back to a position associated with a default position of the master cylinder rod 205 associated with no pressure being applied by a user to the pedal 101. In other words, by the default position is understood the unloaded position of the brake and brake cylinder.

In some embodiment the master cylinder spring 217 may be mounted around an internal master cylinder rod guide 218 to keep the master cylinder spring 217 arranged as intended. In other embodiments the master cylinder spring 217 will be guided to stay in the intended position by the master cylinder piston element 213 and/or the master cylinder stop member 240 and/or a cavity in the end wall of the first end of the master cylinder chamber 217'.

Similar to the configuration in the master cylinder chamber 215, the slave cylinder chamber 221 comprises a slave cylinder rod guide 231 mounted inside the slave cylinder chamber 221 for guiding a slave cylinder rod 230 and allowing movement of the slave cylinder rod 230 only in an axial direction substantially parallel to the axis of movement of the master cylinder rod 205. At least part of the slave cylinder rod 230 is disposed within the slave cylinder chamber 221. The slave cylinder rod 230 is arranged such that the first end of the slave cylinder rod 230' contacts a slave cylinder piston element 223. In some embodiments the slave cylinder rod 230 may comprise an integrated slave cylinder piston element 223 at the first end of the slave cylinder rod 230'. In other embodiments the first end of the slave cylinder rod 230' may be releasably connected to the slave cylinder piston element 223 for example by both components comprising threading such that they may be releasably connected by screwing the slave cylinder piston element 223 onto the first end of the slave cylinder rod 230'. In yet other alternative embodiments the slave cylinder rod 230 is arranged such that the first end of the slave cylinder rod 230' abuts and is in contact with the slave cylinder piston element 223. The slave cylinder piston element 223 has a slave cylinder seal 244 arranged around the body of the slave cylinder piston element 223 to create a fluid tight seal between the volumes of the slave cylinder chamber separated by the cylinder piston element 223. The slave cylinder piston element 223 is adapted to move back and forth inside the slave cylinder chamber 221 along the direction of the longitudinal axis of the slave cylinder chamber 221. A slave cylinder stop member 245 may be located at the closed first end of the slave cylinder chamber 221'. Alternatively, the slave cylinder piston may stop against the end wall of the first end of the slave cylinder chamber 221'. The movement of the slave cylinder piston element 223 within the slave cylinder chamber 221 along the axis of the slave cylinder chamber 221 is at the second end of the slave cylinder chamber 221" limited by the rod guide 231 and at the first end of the slave cylinder chamber 221' it is limited either by the slave cylinder stop member 245 or alternatively by the end of the slave cylinder chamber. The slave cylinder rod guide 231 optionally in combination with slave cylinder spring 233 limits the movement of the slave cylinder rod 230 to be along the axis of the slave cylinder chamber 221.

In various embodiments the slave cylinder piston element 223 is arranged such that it cannot translate past the one or more openings 219 such that fluid from the master cylinder chamber 215 cannot enter the slave cylinder chamber 221 behind the slave cylinder piston element 223, i.e. on the side of the slave cylinder piston element 223 closest to the second end of the slave cylinder chamber 221". In embodiment comprising a slave cylinder stop element 245, this is achieved by the length of the slave cylinder stop member 245 and the dimensions of the slave cylinder piston element 223 being such that it ensures that the slave cylinder piston element 223 cannot be extended past the opening 219 between the master and the slave chambers 215, 211. In embodiments where the travel range of the slave cylinder piston element 223 is limited by the end wall at the first end of the slave cylinder chamber 221', it is achieved by the dimensions, in particular the length of the slave cylinder piston element 223 along the axis of the slave cylinder chamber, being adapted to cover all one or more holes 219 when the slave cylinder piston element 223 contacts the end wall at the first end of the slave cylinder chamber 221'.

In some variants of embodiments having both a master and a slave stop members 240,245, the dimensions of the master and the slave stop members 240,245 as well as the dimensions of the master and the slave piston element 213, 223 are the same. In other variants the dimensions of the components of the master cylinder chamber 215 and the slave cylinder chamber 221 may however vary. In yet other variants a stop member 240,245 may be present in either the master cylinder chamber 215 or the slave cylinder chamber 221 while there is no stop member 240,245 in the other chamber 215,221.

A slave cylinder spring 233 is arranged within the slave cylinder chamber 221 such that the spring forces of the slave cylinder spring 233 acts upon the slave cylinder piston element 223 to bring it back to a default position corresponding to no pressure being applied by the user. In one embodiment the first end of the slave cylinder spring 233' is arranged to contact the end of the slave cylinder piston element 223 facing the second end of the slave cylinder chamber 221' and the second end of the slave cylinder spring 233 opposite of the first end is disposed at the slave cylinder rod guide 231.

When force is applied to the slave cylinder rod 230 such that the slave cylinder rod 230 translates in the direction from the first end of the slave cylinder chamber 221' towards the second end of the slave cylinder chamber 221, i.e. by a user applying pressure to the pedal, the slave cylinder spring 230 is compressed. The forces of the compressed slave cylinder spring 233 applies force to the slave cylinder piston element 223 and the slave cylinder rod guide 231 such that the slave cylinder rod 230 moves back to a default position of the slave cylinder rod 230 associated with no pressure being applied by a user to the pedal 101. In an embodiment the slave cylinder spring 230 is mounted around an internal slave cylinder rod to keep the slave cylinder spring 233 in place.

The second end of the slave cylinder rod 230", i.e. the end opposite the end arranged to contact the slave cylinder piston element 223, is arranged in contact with a damper piston 250. In some variants the damper piston 250 may be connected to the slave cylinder rod 230, e.g. they may be comprised of a single piece of material or they may be assembled from two component that are fixed together or releasably connected. In other variants the slave cylinder rod 230 may simply be arranged to be capable of physically contacting the damper piston 250 without the two components being connected such that force may be transferred from the slave cylinder rod to the damper piston 250.

A damper housing cap 224 is mounted at the second end of the slave cylinder 221". In an embodiment the damper housing cap 224 has an internal thread such the that the cap can apply an adjustable and variably mechanical pressure on the damper 229. The adjustable position of the cap may further contribute to adjusting the travel range of the pedal in the first phase of the braking process before the mechanical stop 260 is engaged. The end bolt 226 locks the cylinder cap 224 in place once it is in the desired position.

Equivalent to the previously described embodiments the region of the slave cylinder from the damper housing cap 224 to the damper piston 250 may be considered the damper housing. The chamber within the damper housing wherein the damper piston 250 is located may in some variants be wider than the slave cylinder chamber 221. Hence it is to be understood that the damper housing 227 may be considered to include the damper cap 224 and/or the damper bracket 251.

In a variant a damper 229 is located between the damper piston 250 and a damper bracket 251. In different variants the one or more dampeners 229 are hollow cylinder-shaped elongated pieces of resilient material that are dimensioned such that when the system is in the relaxed default position the uncompressed dampener 229 extend from the damper piston 250 to the slave cylinder bracket 251. In other variants the one or more dampeners 229 may be a solid elongated piece of resilient material. In such variants having one or more solid dampers 229, each solid damper 229 may have a depression in either or both ends for engaging part of the damper piston 250 and/or damper bracket 251. In embodiments with a single solid dampener 229, the dampener may be mounted such that a flange of the damper piston 250 extends around a first end of the dampener 229 and a flange of the damper bracket extends around the second end of the dampener 229, such that when the dampener 229 is sufficiently compressed the flanges will come in mechanical contact and form a stop enabling the two-phase braking process. The resilient material of the dampener 229 may for example be rubber, silicone or similar known materials that are flexible and elastic. The resilient properties of the material, i.e. the force required to deform a dampener 229, influences the perceived softness of the pedal 101 in use. The less force is required to deform and/or compress the dampener 229 the softer the pedal 101 will be perceived by the user as less force will be required for a response. By the one or more dampeners 229 being elongated is to be understood that in such variants they are longer in the axial direction of the slave cylinder chamber 221 than they are wide in the transverse direction. In an embodiment such an elongated dampener 229 is cylinder-shaped. In an embodiment such an elongated dampener 220 is hollow which is a cylinder-shaped hollow opening in a cylinder-shaped resilient material, i.e. it is a resilient sidewall of a cylinder shape.

In an embodiment the shape of the damper piston 250 is such that a protrusion extends at least partially into the hollow opening of the cylinder-shaped dampener, thereby fixating and guiding the direction in which the damper 229 is bend it is deformed under pressure from the damper piston 250. In some variants the damper piston 250 may further comprise outer edges extending partially along the length of the of the dampener 229 for further fixating and controlling the dampener position. Furthermore, the protrusion of the damper piston 250 may in some embodiments serve as a mechanical stop 260, limiting the travel range of the pedal 101 as well as limiting the compression of the damper 229 as the damper piston 250 can travel no further than to where the protrusion contacts the damper bracket 251 or the damper housing cap 224. A damper bracket 251 is a part of the damper housing placed between the damper 229 and the damper housing cap 224. The shape of the damper bracket 251 is in an embodiment such that a protrusion extends at least partially into the hollow opening of the cylinder-shaped dampener 229, thereby fixating and guiding the direction in the dampener 229 is bend it is deformed under pressure from the damper piston 250. In some variants the damper bracket 251 may further or alternatively comprise outer edges extending partially along the length of the of the dampener 229 for fixating and controlling the dampener position. Furthermore, the protrusion of the damper bracket 251 may in some embodiments serve as a mechanical stop 260 as it becomes the part against which the mechanical stop 260 of the block or damper piston 250 engages limiting the travel of the pedal 101 as well as limiting the compression of the damper 229. In an embodiment damper piston 250 and damper bracket 251 are identical parts arranged with mirrored orientation.

The protrusion of the damper piston 250 optionally in combination with a protrusion of the damper bracket 251 or of the damper housing cap 224 provides a mechanical stop 260 which limits the travel range of the damper piston 250.

Due to this limitation of the travel range of the damper piston 250 the user may experience two phases with different resistance when pressing the brake pedal. The first braking phase is experienced when the damper piston 250 is translating under the force of the pedal depression and the resistance is due to the deformation of the dampener 229. The second braking phase is experienced if the user continues to apply pressure after the protrusion of the damper piston 250 is in mechanical contact with the damper bracket 251, in this case the resistance the user will feel is due to the hydraulic pressure within the brake cylinder, that is from compressing the fluid within the brake cylinder system.

In an alternative embodiment the damper bracket 251 and the damper housing cap 224 is an integral part as shown in FIG. 7.

In embodiments having multiple dampers 229 the damper piston 250 may have multiple protrusions for engaging the hollows of each damper 229. In such embodiments the damper piston 250 may further comprise protrusions extending between neighbouring dampers to further guide their bending during compression. Protrusions extending between neighbouring dampers 229 may also be present in embodiments where one or more dampers are made from a solid piece of resilient material, i.e. without a hollow extending through the damper.

During operation of the brake cylinder 201, applying pressure to the pedal 101 will lead to the master cylinder rod 205 being moved from its default position and translating further into the master cylinder chamber 215 towards the first end of the master cylinder chamber 215'. This movement of the master cylinder rod 205 leads to the master cylinder piston element 213 also translating in the direction towards the first end of the master cylinder 115', thereby exerting a force on a fluid inside the master cylinder chamber 215 (similar to the situation described for the former embodiment and illustrated in FIGS. 4A and 4B). This movement of the master cylinder piston element 213 will force at least some of the fluid from the master cylinder chamber 215 through the one or more openings 219 into the slave cylinder chamber 221. Fluid entering the slave cylinder chamber 221 via the one or more openings 219 increases the pressure within the slave cylinder chamber 221 and exerts a force on the slave cylinder piston element 223 forcing it in a direction opposite that of the master cylinder piston element 213. By the slave cylinder piston element 223 moving in a direction opposite that of the master cylinder piston element 213 is understood that it moves along an axis parallel to the axis of movement substantially parallel to the axis of movement of the master cylinder piston element 213 but towards the opposite end of said axis than the end which the master cylinder piston element 213 moves towards, i.e. in the direction from the first end of the slave cylinder chamber 221' towards the second end of the slave cylinder chamber 221". The dimensions of the one or more openings 219 as well as the number of openings present 219 is adapted to control the flow of fluid exchange between the master cylinder chamber 215 and the slave fluid chamber 221 and thereby affect the force which must be applied to the master cylinder rod 205 to cause the slave cylinder piston element 223 to move, hence the dimensioning and number of openings 219 may vary between different embodiments of the invention. It may be necessary to adapt the dimensioning and number of openings 219 depending on the fluid used, e.g. depending on the viscosity of that fluid.

In one exemplary embodiment there may be two openings 219 each having a diameter of around 1.5 mm.

While the previously described embodiments have referred to one or more openings 219 in the wall 220 separating the master cylinder chamber 215 and the slave cylinder chamber 221, in other embodiments the fluidic exchange between the master cylinder chamber 215 and the slave cylinder chamber 221 may be through a differently arranged channel. For example, the fluidic connection may be through a tube connecting the master cylinder chamber 215 and the slave cylinder chamber 221 externally of the brake cylinder 201. Such a configuration may be beneficial as it allows inspection of the fluid, e.g. through a transparent tube. The tube may also be connected through another device allowing treatment or affecting of the fluid. Furthermore, it enables exchanging of the tube, e.g. to change its length or in case the tube is damaged or clogged. In yet another alternative embodiment the master cylinder chamber 215 and the slave cylinder chamber 221 may be fluidically connected though a channel arranged in the outer wall of the brake cylinder rather than in the wall 220 separating the chambers 215,221. Hence, the holes 219 should be interpreted as a specific embodiment of any type of channel arranged to fluidically connect the master cylinder chamber 215 and the slave cylinder chamber 221.

When the slave chamber piston element 223 is forced to move, it transfers force to the damper piston 250 which in turn is pressed in the same direction as the slave chamber piston element 223 moves, i.e. towards the dampener 229, the damper bracket 251 and the damper housing cap 224. This movement will lead to the compression and/or deformation of the dampener 229. The amount of force needed to elastically deform the dampener 229 depends on the material of choice of the dampener and may vary between embodiments to allow for different load of different brake cylinders to match user preference.

Simultaneously with the movement of the components of the brake cylinder 201 pressure is increased within the master cylinder chamber 215 and the slave cylinder chamber 221.

A pressure sensor 204 may be connected to and in fluid communication with the slave cylinder chamber 221 or the master cylinder chamber 215. There may be further openings in the cylinder chambers for fluid communication of other devices. The pressure sensor 204 is configured to measure the pressure in the brake cylinder 201. The pressure reading from the pressure sensor 204 may then be transmitted to the simulator and correlated to a braking force within the simulation. In the default position corresponding to no pressure being applied to the pedal (such as in the configuration shown on FIG. 3A) there is no elevation of the pressure detected by the pressure sensor 204 and thus the processor of the automotive simulation system does not receive signal indicative of braking activity.

Upon release of the pedal, i.e. when the user no longer applies pressure to the pedal, the brake cylinder system will return to its default position under the spring forces of the master cylinder spring 217, the slave cylinder spring 233, and the dampener 229 as the dampener 229 is decompressed, these forces move the slave chamber piston element 223 and the master cylinder piston element 213 back to their default position thereby also moving fluid which had been forced into the slave cylinder chamber 221 back into the master cylinder chamber 215.

Same as for the pull configuration, the push configuration as exemplified in FIGS. 6-7, the principle can be equivalently employed in a braking system wherein the master cylinder chamber 215 and the slave cylinder chamber 221 are physically separated, i.e. not built into the same cylinder housing 203. In such embodiments the master cylinder chamber 215 and the slave cylinder chamber 221 are connected by an external channel rather than a hole in a shared wall as they do not need to share a wall. The working principle of exchange of fluid between the chambers 215, 221 and the movement of the cylinder rods 205,230 remains the same as will be apparent to one skilled in the art.

Figure 8:
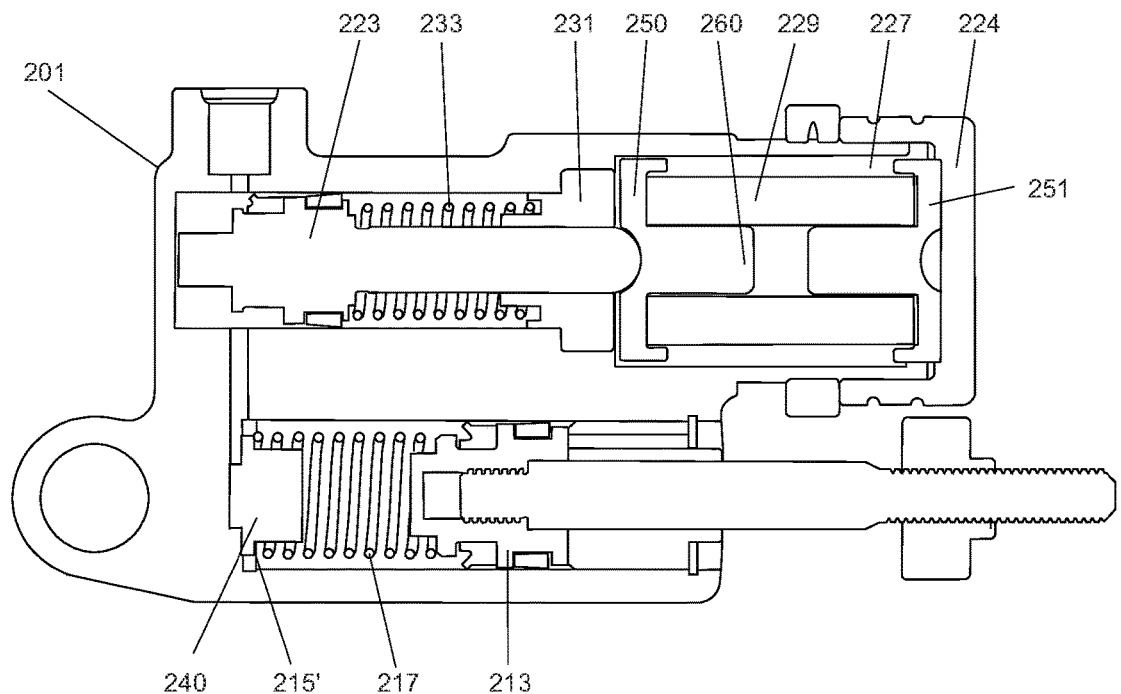
FIG. 8 illustrates a cross sectional view of an embodiment of a brake cylinder based on the same working principle as the one illustrated in FIG. 7.

FIG. 8 illustrates a cross sectional view of an embodiment of a brake cylinder in the push configuration. The working principle and components of the brake cylinder 201 of FIG. 8 is the same as previously described. The embodiment shows how various features previously described may be combined.

The shown embodiment of the push configuration comprises a master cylinder spring 217 arranged between the master piston element 213 and a master cylinder stop element 240 arranged at the first end of the master cylinder chamber 215'. Similarly a slave cylinder spring 233 is arranged between the slave cylinder piston element 233 and a slave cylinder rod guide 231. Both springs 217,233 are arranged to bias the system towards its default position.

The brake cylinder 201 further comprises a damper housing 227 integrated in the brake cylinder housing 203 with a dampener 229 arranged within. A block in the form of a damper piston 250 is arranged in contact with the slave cylinder rod on one side and the damper 229 on the other. A damper housing cap 225 is arranged at the end of the damper housing not facing the slave cylinder chamber 221. A damper bracket 251 is arranged between the damper housing cap 225 and the damper 229. In the embodiment shown in FIG. 8 both the damper piston 250 and the damper bracket 250 comprise protrusions forming mechanical stop 260. When pressure is applied to the pedal the master cylinder moves pressurising the fluid within the brake cylinder causing the slave cylinder rod to translate within the slave cylinder chamber. The slave cylinder rod acts on the damper piston 250 which in turn compresses the dampener 229. The movement of the damper piston 250 towards the damper bracket 251 is stopped once the mechanical stop 260 of the damper piston contacts the protrusion of the damper bracket 251.

The braking process and the feel of the pedal may be adjusted by exchanging the damper 229 using different resilient materials or springs to adjust how much force is required to compress the dampener 229. Different embodiments may further be adjusted by the length of the mechanical stop 260 of the block, damper piston and/or damper bracket, which adjusts how far the pedal can be depressed before the mechanical stop is reached.

Some embodiments of the hydraulic brake cylinder 201, while not shown in any of the illustrations, may be made without a master cylinder spring 217 and/or without a slave cylinder spring 233. In such embodiments, when the pressure applied to the pedal by the user is decreased or released the decompression of the dampener 229 causes the brake cylinder and pedal to return to the default position. As such it is understood that in embodiments wherein a master cylinder spring 217 and/or without a slave cylinder spring 233 is present the force required to depress the pedal also includes the force required to compress such springs 217, 233 in addition to the force required to compress the dampener 229.

Figure 9:
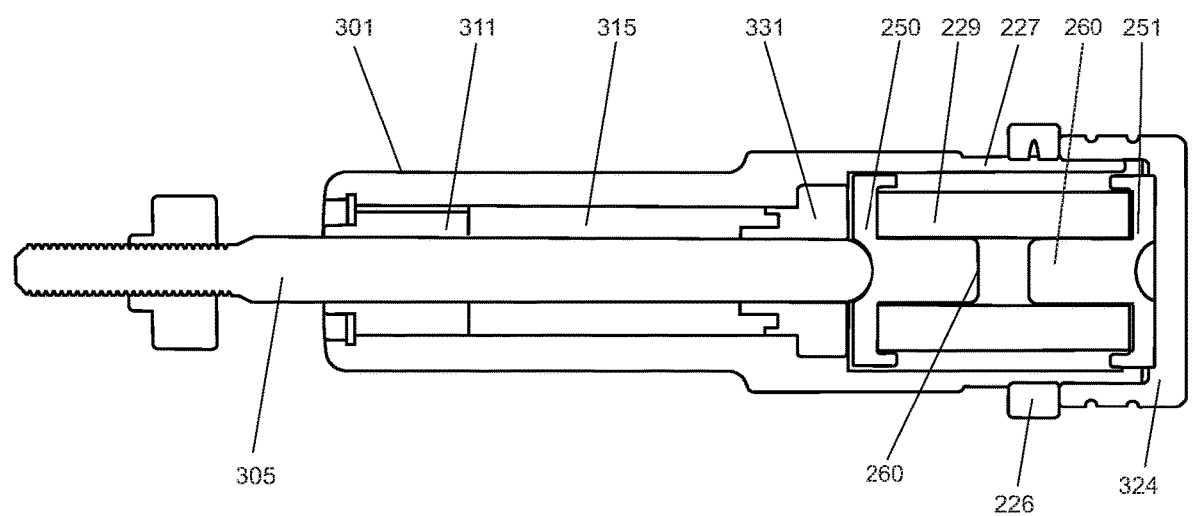
FIG. 9 illustrates an alternative embodiment of a brake cylinder which may replace the brake cylinder of FIG. 1 to be used with the same type of pedal, the cylinder is mechanical having a single cylinder chamber.

FIG. 9 is a cross-sectional view of a mechanical brake cylinder 301, having a single mechanical cylinder chamber 301. In an embodiment no fluid is present in the mechanical cylinder chamber 301 and it is not a hydraulic braking system. As no fluid is present it is to be understood that while the mechanical brake cylinder 301 may be constructed with a mechanical cylinder chamber 315 and damper housing 227 in two separate parts or alternatively the mechanical brake may be formed as a single integrated part in which case int may be considered solely a damper housing 227.

A mechanical cylinder rod 305 enters the mechanical cylinder chamber 315 at the first end of the mechanical cylinder chamber 315'. A mechanical cylinder rod guide 311 is mounted inside the mechanical cylinder chamber 315, near the first end of the mechanical cylinder chamber 315'. The mechanical cylinder rod guide 311 restricts the movement of the mechanical cylinder rod 305 to be only in an axial direction inside the mechanical cylinder chamber 305. The mechanical brake cylinder may in some embodiments further comprise a second mechanical rod guide 331 arranged inside the mechanical cylinder chamber 315, at the second end of the mechanical cylinder chamber 315'. Same as for the other embodiments the mechanical cylinder rod 305 is connected to the pedal of the brake system, such that when a user applies pressure to the pedal, the force is transferred to the mechanical cylinder rod 305 causing it to translate axially inside the mechanical cylinder chamber 315. When pressure is applied to the pedal the mechanical cylinder rod 305 translates in the axial direction from the first end of the mechanical cylinder chamber 315' towards the second end of the mechanical cylinder chamber 315".

The mechanical cylinder rod 305 has a second end 305" which is situated opposite where the mechanical cylinder rod 305 entered the mechanical cylinder chamber 315. The second end of the mechanical cylinder rod 305", is arranged in contact with a damper piston 250. In some variants the damper piston 250 may be connected to the slave cylinder rod 230, e.g. they may be comprised of a single piece of material or they may be assembled from two component that are fixed together or releasably connected. In other variants the mechanical cylinder rod 305 may simply be arranged to be capable of physically contacting the damper piston 250, without the two components being connected, such that force may be transferred from the slave cylinder rod to the damper piston 250. When the pedal of the braking system is pressed by a user the translation of the mechanical cylinder rod 305 transfers force to the damper piston 250 causing it to also translate in the same direction as the mechanical cylinder rod 305.

A damper housing 227 is present at the second end of the mechanical cylinder chamber 315". The damper housing 227 may be an extension of the mechanical cylinder chamber 315 or it may be a separate part mounted to the second end of the mechanical cylinder chamber 315. One or more dampeners 229 as described for the other embodiments of the invention is mounted inside the damper housing 227 of the mechanical brake cylinder 301. A mechanical cylinder cap 324 is adapted to be mounted to the end of the damper housing 227 furthest from the first end of the mechanical cylinder chamber 315'. In an embodiment the mechanical cylinder cap 324 has an internal thread for engaging an external thread on the damper housing 227 such the that the mechanical cylinder cap 324 can apply a an adjustable and variably mechanical pressure on the damper 229. The adjustable position of the cap may further contribute to adjusting the travel range of the pedal in the first phase of the braking process before the mechanical stop 260 is engaged. The end bold 226 locks the cylinder cap 224 in place once it is in the desired position.

In an embodiment a damper bracket 251 is present between the mechanical cylinder cap 324 and the one or more dampeners 229. The damper bracket 251 may be an integrated piece of the mechanical cylinder cap 324 or a separate component. In an embodiment the damper bracket 251 comprises a protrusion which extends at least partially into the hollow, throughgoing opening of a dampener 229. In other embodiments the damper piston 250 similarly comprises a protrusion which extends at least partially into the hollow, throughgoing opening of a dampener 229. When pressure is applied to the damper piston 250 such that it moves in the axial direction towards the damper bracket 251, the damper 229 arranged between the damper position 250 and the damper bracket 251 will be compressed and/or deformed. If enough pressure is applied to the damper piston 250 it will move towards the damper bracket 251 until the protrusion of the damper piston contacts the protrusion of the damper bracket 251. This contact between the two protrusions forms a mechanical stop 260 and hinders the damper piston 250 to be moved further. Thereby a two-phase braking process is achieved for the mechanical system, the first phase being while the dampener 229 is being compressed and the second phase being once mechanical contact has been established between the two protrusions and the damper piston 250 can be moved no further in the direction of the damper bracket 251 whereby the pedal also cannot be pressed further. In hydraulic brake cylinders the user applying force to pedal in the second phase will exert a force on the hydraulic fluid compressing said fluid and increasing the pressure in the cylinder. In the mechanical cylinder the force is exerted solely on the mechanical contact between the two stops, in the exemplary embodiment in the form of the two protrusions.

The skilled person will understand that the mechanical stop 260 enabling the second phase of the braking process may be achieved by other geometries having equivalent functionality. For example a protrusion may extend from only the damper piston 250 and the single protrusion will form a mechanical stop 260 upon contact with a flat surface of the damper bracket 251, or a similar configuration may have a protrusion only from the damper bracket 251. In another example the protrusions may be arranged differently such that they do not extend into a thoroughgoing channel of a dampener 229, but extend as flanges around at least part of either one of or both of the ends of the dampener 229.

The mechanical brake cylinder may be seen as a simplified version of the push configuration of the brake system, having only a single mechanical cylinder chamber 315 such that a single mechanical cylinder rod 305 creates direct mechanical contact from the pedal to the damper piston 250 such that depressing the pedal causes the damper bracket to move towards the dampener 229 and compressing it until a mechanical stop 260 is engaged by the damper piston 250 and it can be translated no further in the direction towards the dampener 229. When force is no longer applied to the pedal, the resilient character of the dampener 229 will cause the damper piston to move back towards the first end of the mechanical cylinder chamber 315 to its default position.

In different embodiments of the mechanical brake cylinder, where no hydraulic fluid is present inside the mechanical cylinder chamber, the braking power is not determined by a pressure sensor after the mechanical stop 260 has been engaged. Other known measurement devices, i.e. sensors alone or in combination with other assistive measurement means, may be used for determining the force applied to the pedal.

In some embodiments of the mechanical brake cylinder the sensor may be a loads cell such as strain gauge or capacitive load cells. When the load cell is in the form of a strain gauge it will measure a direct force applied to the load cell as a consequence of the brake pedal being pressed, i.e. by physical contact between a component, such as a spring, moving against a part of the load cell. In some embodiments of a brake cylinder 301 according to FIG. 1 a load cell sensor may be located between the piston bracket 251 and the mechanical cylinder cap 324 (see FIG. 11A). In other embodiments the measurement device may be a hall effect sensor which is used in combination with a magnet, the Hall effect sensor and the magnet arranged such that depression of the brake pedal causes the distance between the hall sensor and the magnet to change. For example a magnet may be attached to a flange of the damper piston 250 extending around at least part of the ends of the dampener 229 while a Hall effect sensor 109 is attached to a flange of the damper bracket 251 extending around at least part of the ends of the dampener 229 (see FIG. 11B). In such embodiments the magnet will be moved closer to the Hall effect sensor 109 when the pedal is depressed and the damper piston 250 compresses the dampener 229 and moves towards the damper bracket 251 allowing the detection of the change of the magnetic field in response to depression of the pedal. In a variant with the previously described arrangement the dimensions of the flanges is such that the mechanical stop 260 is engaged before the magnet is brought into physical contact with the Hall effect sensor such that the sensor will not be damaged by the mechanical force. In yet other embodiments the sensor 109 used in the mechanical brake cylinder may be a rotary potentiometer. In some embodiments such a rotary potentiometer may be mounted to detect the angular movement of the pedal as it is depressed, for example by mounting the rotary potentiometer outside the brake cylinder to measure the angular movement around the pivot axis 105 (See FIG. 1) where the pedal 101 is connected to the base 103.

While not illustrated on FIG. 9 the cylinder housing 303 of the mechanical brake cylinder 301 may comprise an attachment opening for attaching the mechanical brake cylinder 301 to a support surface of the brake pedal system, same as the other brake cylinder embodiments.

Figure 10A:
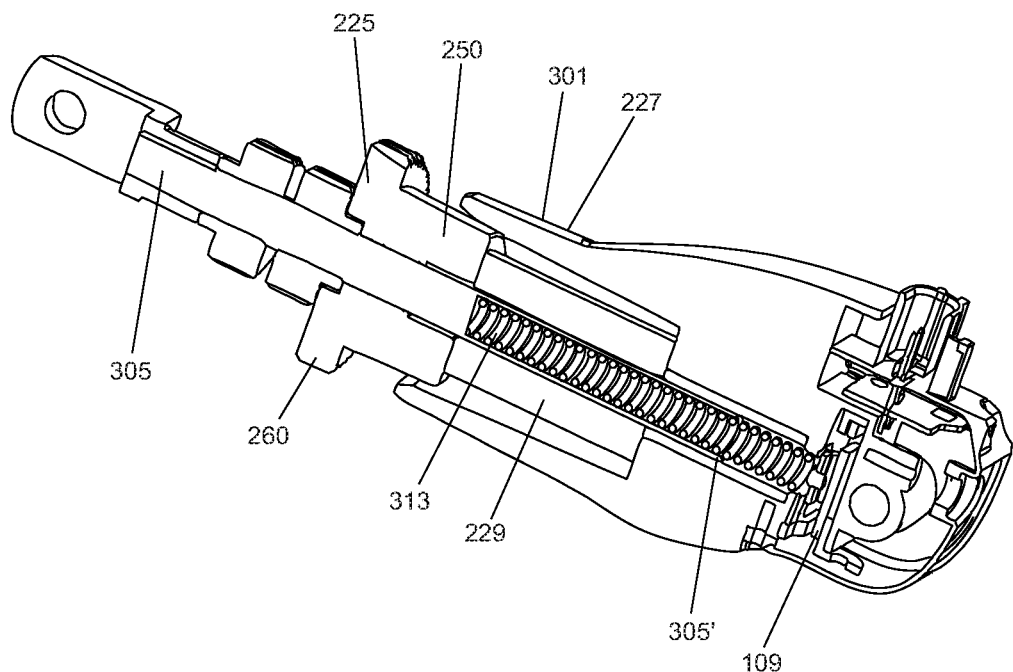
FIGS. 10A and 10B illustrate an alternative embodiment of a brake cylinder which may replace the brake cylinder of FIG. 1 to be used with the same type of pedal, the cylinder is mechanical having a single cylinder chamber.
Figure 10B:
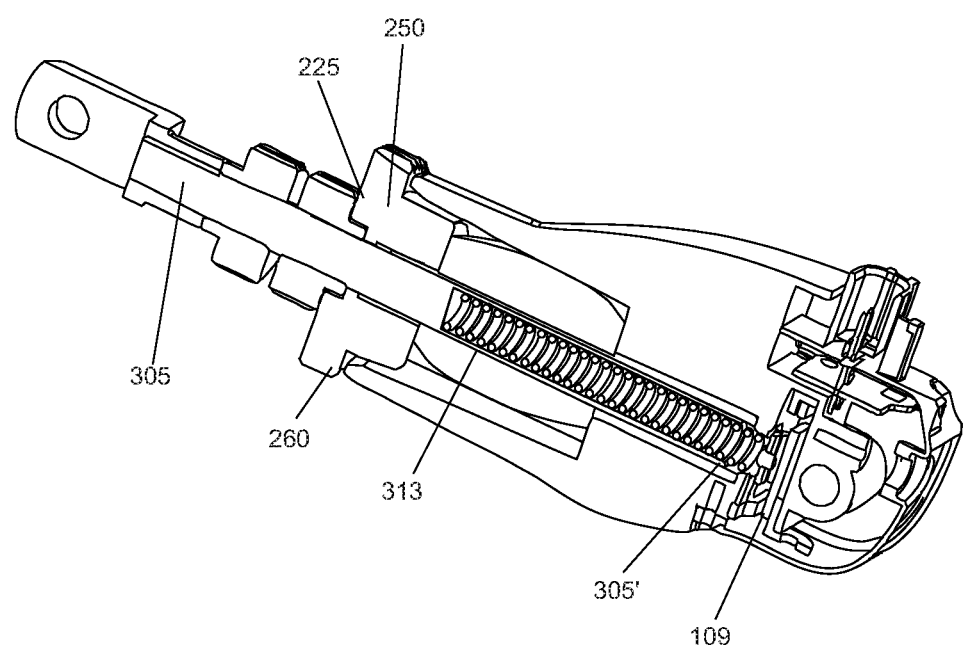

FIGS. 10A and 10B are a cross-sectional views of a mechanical brake cylinder 301, in an embodiment where there brake cylinder comprises a damper housing 227 on its own with no cylinder chamber. In embodiments of the invention which are purely mechanical, i.e. with no hydraulic system, it is not necessary to include a cylinder chamber as there is no need for containment of a hydraulic fluid within such a chamber. The working principle is the same as for the embodiment illustrated in FIG. 9; while FIG. 9 comprises a closed chamber this may be considered an integrated part of the damper housing 227 of the mechanical system or in alternative embodiment of the mechanical braking cylinder a damper housing 227 may be attached to an end of a cylinder chamber.

The embodiment exemplary illustrated in FIGS. 10A and 10B is arranged with the block 225 in a push configuration, such that the movement of the piston causes the block 225/damper piston 250 to move in an axial direction towards the damper thereby compressing a dampener 229 and providing a braking signal via a sensor 109. In other words when a user applies force to the brake pedal it causes the movement of the mechanical cylinder rod 305 which in turn moves the block 225 in the direction of the dampener 229. The damper 229 is compressed under the force of the block moving towards it, until they point where the mechanical stop 260 of the block 225 limits the further movement in the axial direction of the block. In the embodiment shown in FIGS. 10A and 10B this happens as the mechanical stop 260, in the form of an extending flange on the block 225 contacts the damper housing 227 of the mechanical brake cylinder 301.

In the illustrated embodiment of the mechanical brake cylinder 301 the sensor 109 is a load cell comprising a metal plate which will be deformed under pressure and a strain gauge which measures that deformation. When the pedal is depressed and the mechanical cylinder rod 305 moves forward, a mechanical cylinder spring 313 arranged in a hollow of the cylinder rod 305 is pressed against the metal plate of the load cell causing an increased force to be applied to the load cell sensor. An arrangement using a spring the force applied to the load cell is smaller than if a rigid structure such as a rod is used, this allows for the use of load cells that are not constructed to withstand a force as great as what the user applies to the pedal. In other embodiments of the invention it is not necessary to use a spring to apply force to the load cell, other structures such as a rod may be used. For example, the variant shown in FIGS. 10A and 10B may have a solid mechanical cylinder rod 305 without a spring arranged such that the first end of the mechanical cylinder rod 305 contacts the load cell 109 and allows the transfer of force directly to that load cell sensor 109.

In an alternative, sensor configuration might be to substitute the load cell with a hall effect sensor by mounting a magnet at the first end of the mechanical cylinder rod 305' and having a hall effect sensor mounted instead of the metal plate of the strain gauge 109 such that the axial movement of the mechanical cylinder rod 305 will change the magnetic field which is sensed by the hall effect sensor.

FIG. 10A shows the mechanical brake cylinder 301 in an unloaded configuration, i.e. the default position where no force is applied to depress the brake pedal.

FIG. 10B shows the mechanical brake cylinder 301 in the loaded configuration, i.e. where the brake pedal has been depressed by a user, such that the dampener 229 has been compressed and the mechanical stop 260 on the block element 225 which functions as a damper piston 250, engages the cylinder housing of the mechanical brake cylinder. The engagement between the mechanical stop 260 and the damper housing 227 hinders the brake pedal from being further depressed and the dampener 229 form being further compressed.

In hydraulic embodiments of the present invention, the mechanical stop enables the two-phase braking, i.e. the first phase being the compression of the dampener 229 and the second phase ensuing after engagement of the mechanical stop 260 whereafter the hydraulic fluid contained in the brake cylinder 201 is compressed under action of the piston. In the hydraulic brake system the brake action can be measured in both phases as the pressure increases within the brake cylinder 201 as detected by the pressure sensor 204. For the purely mechanical system, embodiments of which are described in FIGS. 9-10, it is not possible to detect increased force applied to the brake pedal 101 after the mechanical stop 260 has been engaged. The FIGS. 10-11 illustrate an alternative embodiment of a mechanical stop wherein force applied to the brake pedal can be detected in both the first phase before engagement of the mechanical stop 260 and in the second phase after engagement of the mechanical stop 260. This is achieved by the presence of a resilient stop damper 270 arranged to be interposed between the surfaces of the mechanical stop 260 which would otherwise be in contact.

Figure 11A:
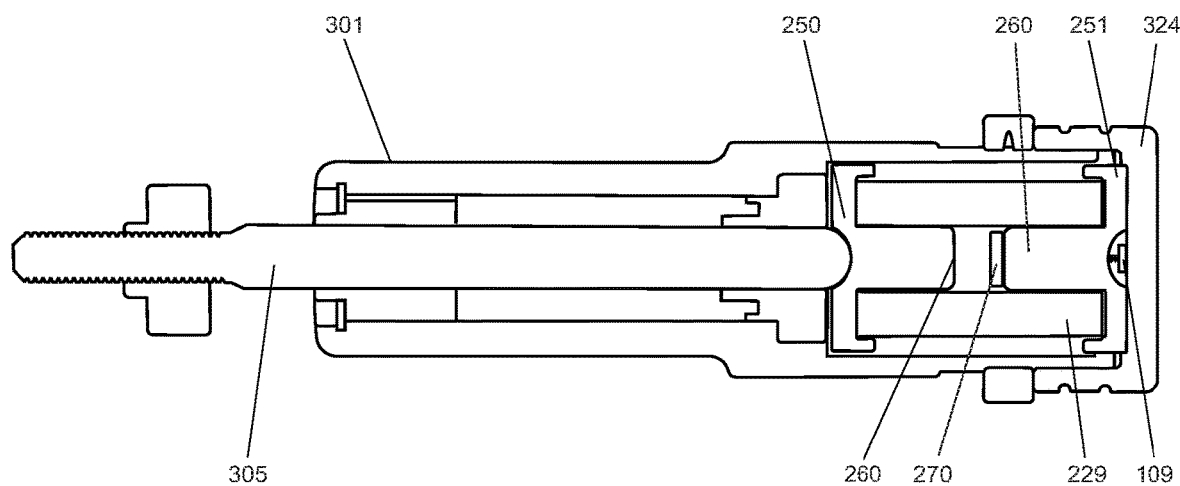
FIGS. 11A and 11B illustrate embodiments of a two-phase mechanical brake cylinder based on the same principle described in FIG. 9.
Figure 11B:
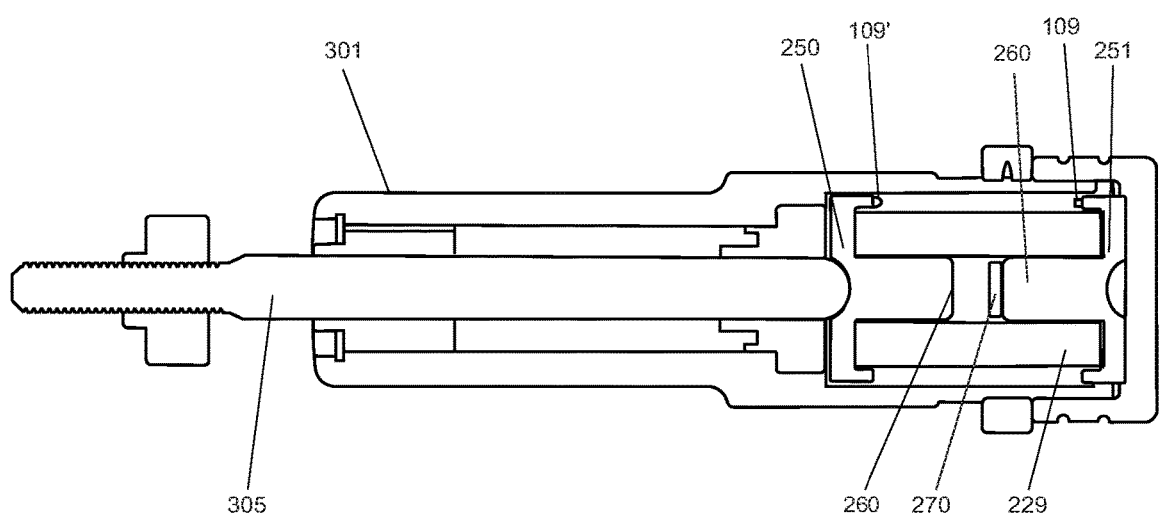

FIGS. 11A and 11B show embodiments of a two-phase mechanical brake cylinder 301 based on the same principle as the embodiment described in relation to FIG. 9. FIGS. 11A and 11B illustrate two potential options for sensor solutions in the context of a mechanical brake cylinder.

The embodiment of FIG. 11A the sensor 109 is a load cell arranged between the piston bracket 251 and the mechanical cylinder cap. In the illustrated embodiment the force is conveyed to the load cell via a spring, however it is to be understood that within other embodiments of the invention a load cell may be arranged differently and the force may be conveyed by a spring or by another structure, such as a rigid rod or directly from another structure of the brake cylinder, such as the piston bracket 251 itself.

The embodiment of FIG. 11B illustrates a potential placement of a magnetic sensor. In this embodiment a magnet 109' is arranged on a flange of the damper piston 250 and a Hall effect sensor 109 is arranged on the flange of the damper bracket 251. By such an arrangement a change in the magnetic field may be detected as the distance between the magnet and the Hall effect sensor changes. In an embodiment as illustrated the magnet 109' and Hall effect sensor 109 are arranged to directly face each other, however it is to be understood that this is not necessary as long as the Hall effect sensor 109 can detect a change in the magnetic field. In some variants multiple magnets may be mounted in the system for a stronger magnetic signal. The illustrated placement of the magnet 109' and the Hall effect sensor 109 is exemplary, both sensor 109 and one or more magnets 109' may be arranged elsewhere on the structure as long as their relative distance is reproducibly changed as the pedal is depressed.

In the embodiments of FIGS. 11A and 11B, a resilient stop damper 270 is arranged to protrude from the surface a mechanical stop 260 facing another mechanical stop 260. As illustrated in FIG. 11 the stop damper 270 is protruding from the surface of the damper bracket 251, in other embodiments the stop damper 270 may protrude from the damper piston 250 instead. In some embodiments the stop damper 270 may be attached to the surface in other embodiments it may be embedded in and protruding from the surface of the damper piston 250 or damper bracket, respectively. When the mechanical cylinder rod 305 translates in the direction towards the damper bracket 251, the damper piston 250 will also translate towards the damper bracket 251. The resilient dampener 229 will be compressed under the mechanical force of the damper piston 250 until the mechanical stop 260 is engaged. In this embodiment the mechanical stop 260 is engaged when the mechanical stop surface of the damper piston 250 engages the stop damper 270 protruding from the mechanical stop surface of the damper bracket 251.

Figure 12A:
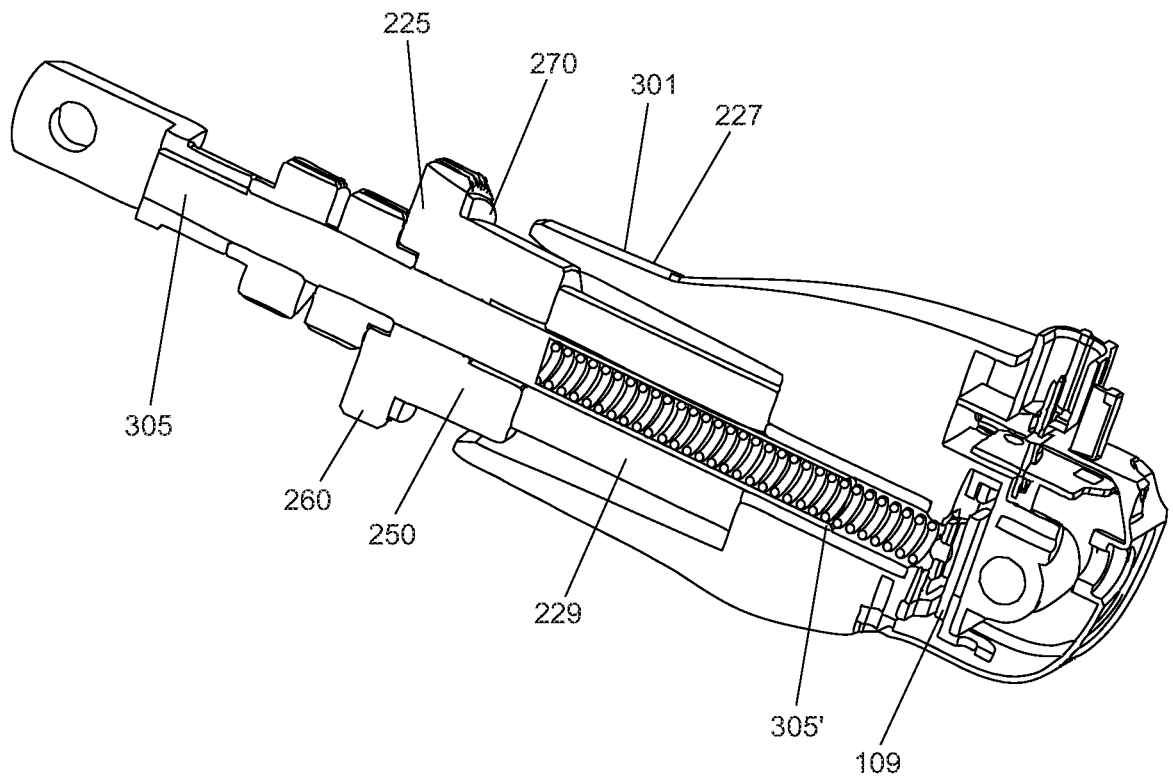
FIGS. 12A and 12B illustrate embodiments of a two-phase mechanical brake cylinder based on the same principle as the embodiment described in FIGS. 10A and 10B.
Figure 12B:
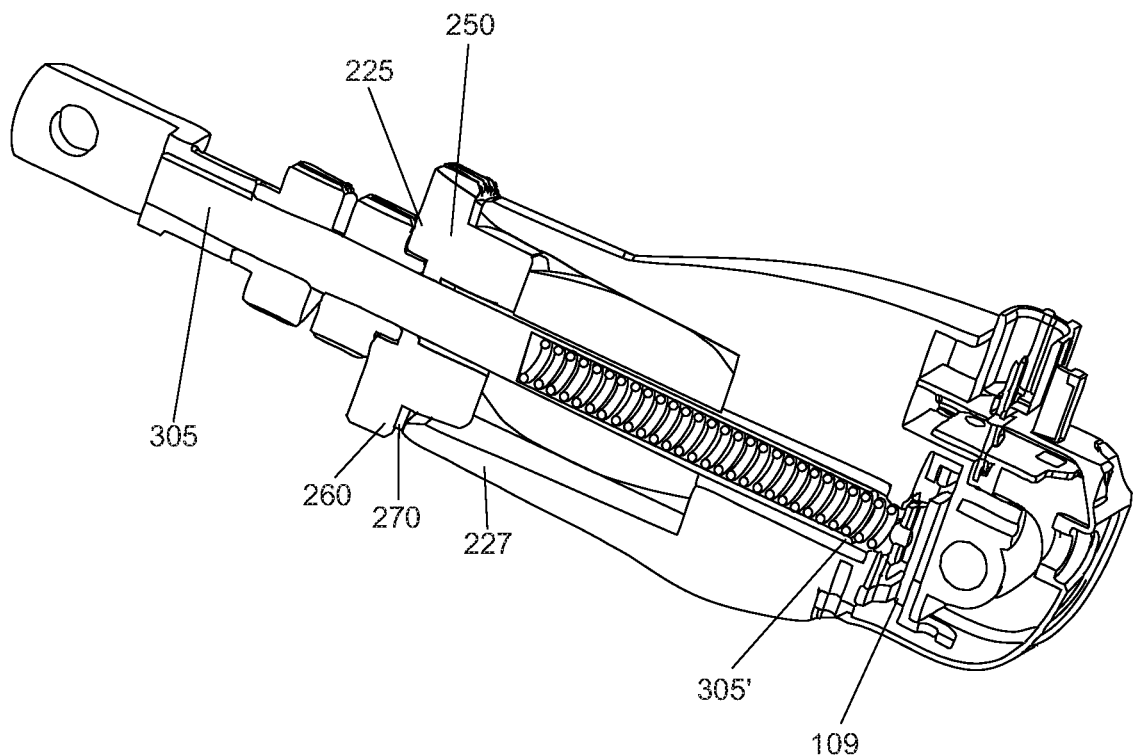

FIGS. 12A and 12B illustrates an embodiment of a two-phase mechanical brake cylinder 301 based on the same principle as the embodiment described in relation to FIGS. 10A-10B. In the embodiment of FIG. 12A-12B, a resilient stop damper 270 is arranged interposed between the protruding flange part of the block element 225 which forms the mechanical stop 260 of the block element 225 and the damper housing 227 of the mechanical brake cylinder 301. In an embodiment as illustrated in FIGS. 12A and 12B the stop damper 270 takes the form of an O-ring or washer arranged around the block element 225 along the face of the protruding flange element which forms the mechanical block 260 which faces the damper housing 227. In such an embodiment, force applied to the mechanical cylinder rod 305 in the direction toward the damper housing 227 causes the block element 225 to compress the dampener 229 until the mechanical stop 260 is engaged, i.e. when the stop damper 270 of the mechanical stop 260 engages the damper housing 227 as illustrated in FIG. 12B. It will be clear to the person skilled in the art that the stop damper 270 may also be arranged on the surface of the damper housing 227 which the mechanical stop 260 of the damper piston 250 contacts. The stop damper 270 will provide the same function regardless of it specific mounting as long as it is interposed between the two surfaces which would otherwise engage when the mechanical stop 260 is engaged, such that said surfaces engage the stop damper 270. In embodiments the stop damper 270 is an integrated part of the mechanical stop 260. In other embodiments the stop damper 270 may be a separate part arranged such that the movement of the piston of the mechanical brake cylinder causes the stop damper 270 to come into contact with the mechanical stop 260; in such embodiments the engagement of the mechanical stop and the beginning of the second phase takes place once compression of the stop damper 270 is caused by the continued application of pressure to the brake pedal.

Like the dampener 229, the stop damper 270 may be made from an elastomer material, such as nitril, silicone, fluorosilicone, neoprene, polyacrylate, polyurethane, polyisoprene and similar material. Alternatively, the stop damper 270 may be a different structure such as a spring which will also resiliently provide resistance for the axial movement of the piston in the direction towards the stop damper 270. In some embodiments of the invention the stop damper 270 may be made from the same material as the dampener 229. In such embodiments the force required to move the mechanical piston further in the axial direction toward the stop damper 270 and the dampener 229 after engagement of the mechanical stop is increased as such movement requires compression of both the stop damper 270 and the dampener 229 during the second phase.

In some alternative embodiments comprising a stop damper 270, the stop damper 270 is made of a resilient structure which requires a different force to compress than what is required to compress the dampener 229. In one embodiment, the stop damper 270 requires a higher force to compress than the dampener 229. Within an embodiment of the invention the stop damper 270 has a Shore A hardness exceeding the Shore A hardness of the dampener 229. For example, the Shore A hardness of the stop damper 270 may be in the range of 80-100 when measured according to ASTM D2240. In some embodiments the stop damper 270 may be an elastomer material while the dampener 229 is a form of spring as previously discussed. The resistance felt by the user in the second phase of the braking may be varied in the same brake system by exchanging the stop damper 270 with another stop damper 270 having a different Shore A hardness.

As the stop damper 270 and the dampener 229 together are harder to compress than the dampener 229 alone, the user applying force to the system will experience resistance at two different levels before and after engaging the mechanical stop 260, i.e. the user will experience two-phase braking wherein some compression may take place during the second phase. The sensor 109 of the mechanical cylinder can detect the applied force as previously described for the mechanical brake cylinders 301. During the second phase of the braking, the user will need to compress the stop damper 270 to affect the sensor 109, e.g. by moving the first end of the cylinder rod 305' towards the sensor 109, hence in the second phase the user will need to apply greater force than in the first phase to achieve a change in the detected signal. This emulates both the feeling and the effect of a hydraulic brake cylinder, wherein force applied after the mechanical stop 260 has been engage is detectable by the brake system and wherein the force necessary to increase the braking signal is higher in the second phase than in the first phase of the braking action.

A central principle to all of the discussed embodiments of the invention is that a piston when moved in the axial direction towards a dampening device will compress that dampening device, the dampening device in turn provides resistance to the movement of the piston in that axial direction. A mechanical stop is present and limits the movement of the piston in the axial direction towards the dampening device. This principle is illustrated conceptually in FIGS. 13A and 13B. While the three elements of the invention discussed for the general concept, i.e. the dampening device 440, the piston 450 having a mechanical stop 460, and the stopping structure 470, have been discussed in specific embodiments it is to be understood that the invention is not limited to these specific embodiments, but may take various forms that provide the same functionality.

Figure 13A:
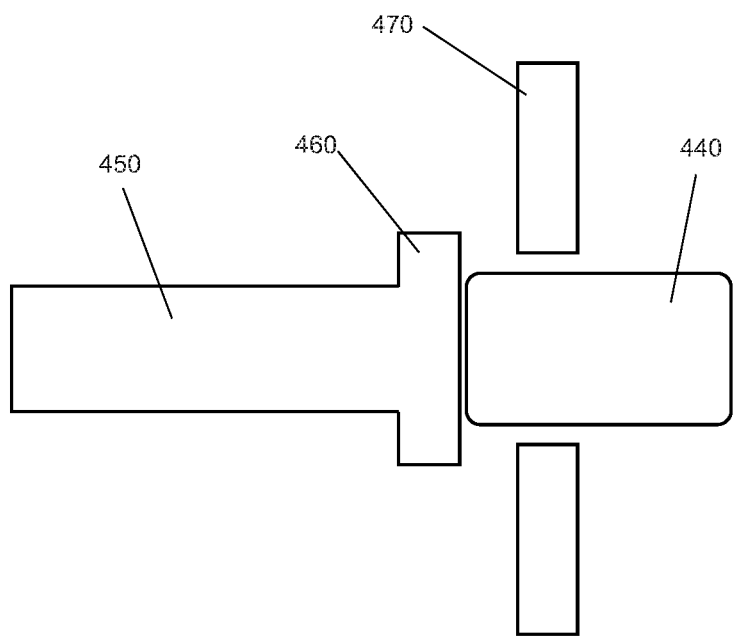
FIGS. 13A and 13B conceptually depicts the general concept of the mechanical stop, piston and dampening device according to one embodiment.
Figure 13B:
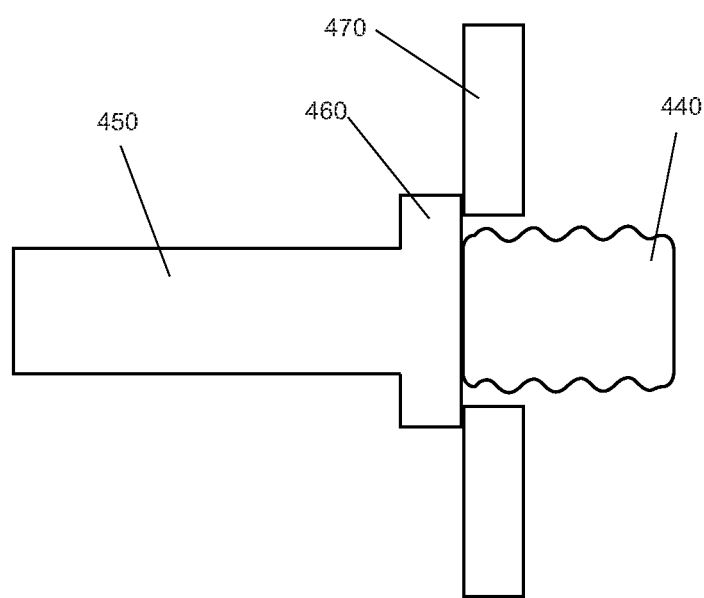

FIG. 13A illustrates a default position where the dampening device 440 is not compressed. FIG. 13B illustrates a situation where the piston 450 has been moved in the direction towards the dampening device 440 until the mechanical stop 460 has engaged the stopping structure 470 and in which position the dampening device 440 is providing resistance against the movement of the piston, e.g. by elastic deformation.

The dampening device 440 may for example be a brake cylinder house or damper house with a dampener 229 inside as previously described. Such a dampener 229 may be an elastomer, a spring or a hydraulic damper such as an oil or gas damper. Alternative variants of the dampening device 440 may be a resilient dampener such as an elastomer material or a spring arranged without a housing. For example, an elastomer may be mounted around a bar interposed between part of the piston 450 and a backplate or be fixedly attached to such a bar. In yet another exemplary alternative the dampening device 440 may be a resilient elastomer mounted in a shell structure such as a half-sphere.

The stopping structure 470 may be any sort of structure which limits the continued movement of the piston 450 in the axial direction toward the dampening device 440 once the mechanical stop 460 of the piston 450 engages the stopping structure 470. Hence in variants of the invention the mechanical stop may be considered to comprise two parts, i.e. a first part 460 of the piston 450 and a second part which is the stopping structure 470 which the piston 450 engages. In some variants the stopping structure 470 may be part of the dampening device 440, e.g. where the dampening device is a housing with a resilient structure and the housing may act as the stopping structure 470 which the piston engages. In other variants the stopping structure 470 may be arranged adjacent to the dampening device 440. In one embodiment, the stopping structure 470 may be one or more bars adjacent to a resilient structure or it may be part of a shell structure, such as a half-sphere holding the resilient structure. In another example the stopping structure 470 may be a bar extending partially into a cylindrical cavity of the resilient structure, e.g. it may be a bar around which a spring is mounted. In some variants the part of the piston 450 forming the mechanical stop 260' is at least part of the piston element which engages the resilient structure of the dampening device 440. In other variants the mechanical stop part of the piston 450 may be a protrusion from the part of the piston element engaging the resilient structure of the dampening device 440. In yet other variants the stopping structure 470 may be located independently of the dampening device 440, for example the piston 450 may comprise a protrusion from the piston rod forming the mechanical block 460' of the piston engaging the other part of the stopping structure 470 which may be mounted independently of the dampening device 440.

It is to be understood that while the piston in the conceptual illustration of FIGS. 13A and 13B shows a rod with a piston element, the piston may take any other shape, e.g. it may be a rod with a continuous cross section, it may be tapered or have various protrusions and/or flanges. In some variants the piston 450 may be the pedal itself. For example, the back of the pedal may be connected directly to a dampening device 440 such as a spring. In such a variant the movement of the pedal may directly be blocked by a stopping structure 470 in the form of a structure limiting the further angular movement of the pedal, such as a pillar, a cylindrical structure around part of the resilient member or a screw at the mounting plate on which the pedal is fastened.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A brake cylinder configured to provide brake signaling to an automotive simulator, the brake cylinder comprising:
   a piston connected to a brake pedal configured to move in an axial direction when said brake pedal is being depressed;
   a damper that provides resistance to the piston when the piston moves in an axial direction toward said damper;
   at least one sensor configured to measure a response to movement of said piston and send a signal to a processor of the automotive simulator indicative of that movement;
   wherein said piston comprises a mechanical stop configured to limit said axial movement of the piston in the axial direction, wherein when said brake pedal is being depressed the piston and the mechanical stop moves in the axial direction resulting in compression of the damper until the mechanical stop has engaged a stopping structure.

2. A brake cylinder according to claim 1, a dampening device comprising:
   a damper housing and the damper arranged within the damper housing,
   the piston being configured to move a block in the axial direction at least partially into the damper housing towards said resilient damper.

3. The brake cylinder according to claim 2, wherein said mechanical stop is configured to limit said axial movement of said block in the direction towards said resilient damper.

4. The brake cylinder according to claim 2, wherein the mechanical stop is configured to limit the axial movement of said block by contact between said mechanical stop and said damper housing.

5. The brake cylinder according to claim 2, wherein the piston further includes a threaded nut, the block is disposed between the damper and the threaded nut, and the threaded nut is configured to adjust the response of a brake pedal.

6. The brake cylinder according to claim 2, the damper housing further comprising a damper housing cap, the damper housing cap being adjustably connected to the end of the damper housing such that the adjustment of the connection changes the length of a chamber within the damper housing wherein the damper is located.

7. The brake cylinder according to claim 2, the damper housing further comprising a damper bracket, the damper bracket comprising at least one protrusion forming a mechanical stop for engaging the mechanical stop of the block.

8. A brake system configured to provide brake signalling signaling to an automotive simulator, the brake system comprising:
   a base;
   a brake pedal pivotably connected to said base; and
   a brake cylinder according to claim 2 connected to the brake pedal.

9. A brake system according to claim 8, wherein the brake cylinder is pivotably connected to the brake pedal.

10. The brake cylinder according to claim 1, wherein the piston is configured to be mechanically connected to a brake pedal.

11. The brake cylinder according to claim 1, wherein the at least one sensor is a load cell, a strain gauge, a rotary potentiometer, a hall effect sensor or a pressure sensor, said sensor may be present in combination with one or more additional sensors of any of the mentioned types.

12. The brake cylinder according to claim 1, the damper being configured to provide resistance to the piston when the piston moves in an axial direction toward the damper upon engagement of the mechanical stop.

13. The brake cylinder according to claim 1, wherein the brake cylinder comprises a cylinder chamber.

14. The brake cylinder according to claim 13 wherein the piston includes:
   a rod at least partially disposed within the cylinder chamber;
   a brake pedal connector configured to attach said rod to a brake pedal; and
   a brake arm adjuster configured to adjust the distance between the brake pedal connector and the rod.

15. The brake cylinder according to claim 13, wherein the cylinder chamber is a slave cylinder chamber, the piston is a slave cylinder piston and the brake cylinder further comprises:
   a master cylinder chamber and at least one channel configured to provide fluid communication between the master cylinder chamber and the slave cylinder chamber;
   a master piston at least partially disposed within the master cylinder chamber, the master piston configured to pressurize fluid in the master cylinder chamber when a brake pedal is depressed effecting the translation of the master piston along the axis of the master cylinder; and
   the at least one sensor being a pressure sensor configured to measure the pressure inside the brake cylinder,
   wherein, when pressurizing fluid is in the master cylinder chamber, the master piston is configured to drive said fluid from the master cylinder chamber to the slave cylinder chamber via the at least one channel to increase pressure in the slave cylinder chamber.

16. The brake cylinder according to claim 15, wherein master cylinder chamber and the slave cylinder chambers are adjacent and a wall is disposed between the master cylinder chamber and the slave cylinder chamber, wherein the axis of the master piston and the axis of the slave piston are parallel to each other.

17. The brake cylinder according to claim 16, the at least one channel is an opening in the wall, said opening configured to provide fluid communication between the master cylinder chamber and the slave cylinder chamber.

18. The brake cylinder according to claim 15, further comprising:
- a master spring connected to the master piston, the master spring configured to bias the master piston towards a default position of the master piston; and/or
- a slave cylinder spring connected to the slave piston, the slave cylinder spring configured to bias the slave piston towards a default position of the slave position.

* * * * *